US009277252B2

(12) United States Patent
Ha et al.

(10) Patent No.: US 9,277,252 B2
(45) Date of Patent: Mar. 1, 2016

(54) METHOD AND APPARATUS FOR ADAPTIVE STREAMING BASED ON PLURALITY OF ELEMENTS FOR DETERMINING QUALITY OF CONTENT

(75) Inventors: Ho-jin Ha, Suwon-si (KR); O-hoon Kwon, Suwon-si (KR); Guanhua Zhang, Suwon-si (KR); Hyung-tak Choi, Suwon-si (KR); Sun-bal Kim, Suwon-si (KR); Ji-eun Keum, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/153,523

(22) Filed: Jun. 6, 2011

(65) Prior Publication Data

US 2011/0302319 A1 Dec. 8, 2011

Related U.S. Application Data

(60) Provisional application No. 61/370,957, filed on Aug. 5, 2010, provisional application No. 61/356,641, filed on Jun. 20, 2010, provisional application No. 61/351,434, filed on Jun. 4, 2010.

(30) Foreign Application Priority Data

Feb. 8, 2011 (KR) ........................ 10-2011-0011110

(51) Int. Cl.

*G06F 15/16* (2006.01)
*H04N 21/2343* (2011.01)
*H04N 21/235* (2011.01)

(Continued)

(52) U.S. Cl.

CPC ..... *H04N 21/23439* (2013.01); *H04N 21/2353* (2013.01); *H04N 21/2362* (2013.01); *H04N 21/2402* (2013.01); *H04N 21/6581* (2013.01); *H04N 21/812* (2013.01); *H04N 21/8456* (2013.01)

(58) Field of Classification Search

CPC ............................ H04L 65/60; H04N 21/2349
USPC .......................................................... 709/231
See application file for complete search history.

(56) References Cited

U.S. PATENT DOCUMENTS 5,784,528 A 7/1998 Yamane et al.
5,953,506 A * 9/1999 Kalra et al. .................. 709/231

(Continued)

FOREIGN PATENT DOCUMENTS

CN 1290895 A 4/2001
CN 1459066 A 11/2003

(Continued)

OTHER PUBLICATIONS

Communication, dated Mar. 28, 2012, issued by the International Searching Authority in corresponding International Application No. PCT/KR2011/004064.

(Continued)

*Primary Examiner* — Christopher Biagini
(74) *Attorney, Agent, or Firm* — Sughrue Mion, PLLC

(57) ABSTRACT

A method and apparatus are provided for performing adaptive streaming according to a streaming environment based on information about a plurality of elements for determining qualities of a plurality of media data with respect to the same content.

20 Claims, 26 Drawing Sheets

(51) Int. Cl.

| | |
|---|---|
| ***H04N 21/2362*** | (2011.01) |
| ***H04N 21/24*** | (2011.01) |
| ***H04N 21/658*** | (2011.01) |
| ***H04N 21/81*** | (2011.01) |
| ***H04N 21/845*** | (2011.01) |

(56) References Cited

U.S. PATENT DOCUMENTS

| | | | | |
|---|---|---|---|---|
| 6,851,091 | B1 | 2/2005 | Honda et al. | |
| 6,895,410 | B2 | 5/2005 | Ridge | |
| 7,103,668 | B1 | 9/2006 | Corley et al. | |
| 7,421,127 | B2 | 9/2008 | Bruls et al. | |
| 7,447,791 | B2 | 11/2008 | Leaning et al. | |
| 7,944,908 | B2 | 5/2011 | Lee et al. | |
| 8,176,029 | B2 * | 5/2012 | Wang | 707/706 |
| 8,341,662 | B1 | 12/2012 | Bassett et al. | |
| 8,661,105 | B2 | 2/2014 | Tian et al. | |
| 2001/0004739 | A1 * | 6/2001 | Sekiguchi et al. | 707/100 |
| 2002/0053085 | A1 | 5/2002 | Toguri | |
| 2002/0161739 | A1 | 10/2002 | Oh | |
| 2003/0061369 | A1 | 3/2003 | Aksu et al. | |
| 2003/0072376 | A1 | 4/2003 | Krishnamachari et al. | |
| 2003/0177503 | A1 | 9/2003 | Sull et al. | |
| 2003/0189649 | A1 | 10/2003 | Kuno | |
| 2004/0064572 | A1 | 4/2004 | Yamaguchi et al. | |
| 2004/0064573 | A1 | 4/2004 | Leaning et al. | |
| 2004/0119814 | A1 | 6/2004 | Clisham et al. | |
| 2004/0220966 | A1 | 11/2004 | Ridge | |
| 2005/0018873 | A1 | 1/2005 | Rhoads | |
| 2005/0047345 | A1 | 3/2005 | Suh | |
| 2005/0071491 | A1 | 3/2005 | Seo | |
| 2005/0102371 | A1 | 5/2005 | Aksu | |
| 2005/0135476 | A1 | 6/2005 | Gentric et al. | |
| 2005/0160177 | A1 | 7/2005 | Kim | |
| 2005/0183120 | A1 | 8/2005 | Jain et al. | |
| 2005/0193138 | A1 | 9/2005 | Kim | |
| 2005/0193425 | A1 | 9/2005 | Sull et al. | |
| 2005/0198282 | A1 | 9/2005 | Stahl et al. | |
| 2005/0262541 | A1 | 11/2005 | Oota | |
| 2006/0120378 | A1 | 6/2006 | Usuki et al. | |
| 2006/0126713 | A1 | 6/2006 | Chou et al. | |
| 2007/0003251 | A1 | 1/2007 | Chung et al. | |
| 2007/0016657 | A1 | 1/2007 | Ito | |
| 2007/0025687 | A1 | 2/2007 | Kim | |
| 2007/0101164 | A1 | 5/2007 | Ando et al. | |
| 2007/0177854 | A1 | 8/2007 | Ando et al. | |
| 2008/0040498 | A1 | 2/2008 | Setlur et al. | |
| 2008/0109532 | A1 * | 5/2008 | Denoual | H04L 12/58 709/219 |
| 2008/0177865 | A1 | 7/2008 | Heo et al. | |
| 2008/0195743 | A1 | 8/2008 | Brueck et al. | |
| 2008/0301380 | A1 | 12/2008 | Itho | |
| 2009/0018681 | A1 | 1/2009 | Lee et al. | |
| 2009/0031007 | A1 | 1/2009 | Boic et al. | |
| 2009/0055547 | A1 * | 2/2009 | Hudson et al. | 709/231 |
| 2009/0089535 | A1 | 4/2009 | Lohmar et al. | |
| 2009/0097819 | A1 | 4/2009 | Dui et al. | |
| 2009/0106288 | A1 | 4/2009 | Yang et al. | |
| 2009/0110060 | A1 | 4/2009 | Cortes et al. | |
| 2009/0141888 | A1 | 6/2009 | Kim et al. | |
| 2009/0204487 | A1 | 8/2009 | Cansler et al. | |
| 2009/0258594 | A1 | 10/2009 | Martin-Cocher et al. | |
| 2009/0300145 | A1 | 12/2009 | Musayev et al. | |
| 2009/0300204 | A1 * | 12/2009 | Zhang et al. | 709/231 |
| 2010/0046611 | A1 | 2/2010 | Toma et al. | |
| 2010/0138489 | A1 | 6/2010 | Corley et al. | |
| 2011/0022471 | A1 * | 1/2011 | Brueck et al. | 705/14.61 |
| 2011/0029649 | A1 | 2/2011 | Tian et al. | |
| 2012/0201516 | A1 | 8/2012 | Uchiike | |
| 2015/0256585 | A1 | 9/2015 | Brueck et al. | |

FOREIGN PATENT DOCUMENTS

| | | | |
|---|---|---|---|
| CN | 1481643 | A | 3/2004 |
| CN | 1559119 | A | 12/2004 |
| CN | 1568620 | A | 1/2005 |
| CN | 1575603 | A | 2/2005 |
| CN | 1592418 | A | 3/2005 |
| CN | 1625880 | A | 6/2005 |
| CN | 1698378 | A | 11/2005 |
| CN | 1764974 | A | 4/2006 |
| CN | 1784652 | A | 6/2006 |
| CN | 1787422 | A | 6/2006 |
| CN | 1902865 | A | 1/2007 |
| CN | 1985321 | A | 6/2007 |
| CN | 1988547 | A | 6/2007 |
| CN | 101014947 | A | 8/2007 |
| CN | 101018323 | A | 8/2007 |
| CN | 101247511 | A | 8/2008 |
| CN | 101321265 | A | 12/2008 |
| CN | 101365128 | A | 2/2009 |
| CN | 101371307 | A | 2/2009 |
| CN | 101459809 | A | 6/2009 |
| CN | 101518027 | A | 8/2009 |
| CN | 101521583 | A | 9/2009 |
| EP | 1 043 892 | A1 | 10/2000 |
| EP | 2117143 | A2 | 11/2009 |
| JP | 06-252876 | A | 9/1994 |
| JP | 200013761 | A | 1/2000 |
| JP | 2001-024994 | A | 1/2001 |
| JP | 2001-359081 | A | 12/2001 |
| JP | 2003-087737 | A | 3/2003 |
| JP | 2004-88766 | A | 3/2004 |
| JP | 2004-140584 | A | 5/2004 |
| JP | 2004-140654 | A | 5/2004 |
| JP | 2004-186890 | A | 7/2004 |
| JP | 2004-312304 | A | 11/2004 |
| JP | 2005-039667 | A | 2/2005 |
| JP | 2005-073138 | A | 3/2005 |
| JP | 2005-229153 | A | 8/2005 |
| JP | 2005-303927 | A | 10/2005 |
| JP | 2006-304232 | A | 11/2006 |
| JP | 2006-311328 | A | 11/2006 |
| JP | 2007-11584 | A | 1/2007 |
| JP | 2007-25959 | A | 2/2007 |
| JP | 2008-97381 | A | 4/2008 |
| JP | 2008-236667 | A | 10/2008 |
| JP | 2009-17345 | A | 1/2009 |
| JP | 2009-134700 | A | 6/2009 |
| JP | 2009-159625 | A | 7/2009 |
| KR | 100805308 | B1 | 2/2008 |
| KR | 1020080099629 | A | 11/2008 |
| KR | 1020090028017 | A | 3/2009 |
| KR | 1020090036765 | A | 4/2009 |
| KR | 10-2009-0063775 | A | 6/2009 |
| KR | 100920733 | | 10/2009 |
| KR | 1020100007368 | A | 1/2010 |
| WO | 2005/043783 | A1 | 5/2005 |
| WO | 2006/105158 | A2 | 10/2006 |
| WO | 2008/062979 | A1 | 5/2008 |
| WO | 2008/130191 | A1 | 10/2008 |
| WO | 2009/119394 | A1 | 10/2009 |
| WO | 2009/158344 | A2 | 12/2009 |

OTHER PUBLICATIONS

International Search Report, dated Jul. 8, 2011, issued by the International Searching Authority in counterpart International Application No. PCT/KR2010/008016.

International Search Report, dated Jul. 13, 2011, issued by the International Searching Authority in counterpart International Application No. PCT/KR2010/008017.

International Search Report, dated Jul. 15, 2011, issued by the International Searching Authority in counterpart International Application No. PCT/KR2010/008068.

International Search Report, dated Aug. 16, 2011, issued by the International Searching Authority in counterpart International Application No. PCT/KR2010/008060.

International Search Report, dated Jul. 25, 2011, issued by the International Searching Authority in counterpart International Application No. PCT/KR2010/008015.

(56) References Cited

OTHER PUBLICATIONS

International Search Report, dated Aug. 31, 2011, issued by the International Searching Authority in counterpart International Application No. PCT/KR2010/008696.
International Search Report, dated Nov. 25, 2011, issued by the International Searching Authority in counterpart International Application No. PCT/KR2011/001268.
International Search Report, dated Nov. 3, 2011, issued by the International Searching Authority in counterpart International Application No. PCT/KR2011/001898.
Communication dated Aug. 27, 2014, issued by the State Intellectual Property Office of the People's Republic of China in counterpart Chinese Application No. 201080061494.4.
Communication dated Aug. 4, 2014, issued by the State Intellectual Property Office of the People's Republic of China in counterpart Chinese Application No. 201080061416.4.
Communication dated Aug. 5, 2014, issued by the Japanese Patent Office in counterpart Japanese Application No. 2012-538771.
Communication dated Aug. 20, 2014, issued by the State Intellectual Property Office of the People's Republic of China in counterpart Chinese Application No. 201080061434.2.
Communication dated Aug. 5, 2014, issued by the Japanese Patent Office in counterpart Japanese Application No. 2012-538768.
Communication dated Aug. 19, 2014, issued by the Japanese Patent Office in counterpart Japanese Application No. 2012-543023.
Communication dated Sep. 24, 2014, issued by the Japanese Patent Office in counterpart Japanese Application No. 2012-553824.
Communication dated Feb. 7, 2014 issued by the European Patent Office in counterpart European Application No. 10830205.0.
Pantos R., et al., "HTTP Live Streaming; draft-pantos-http-live-straming-0.2.txt", Oct. 5, 2009, 20 pgs. total, XP015064407.
Alex Zambelli, "IIS Smooth Streaming Technical Overview", Mar. 31, 2009, 17 pgs. total, XP055009366.
Jin Young Lee et al., "DASH Evaluation Experiment #1: Compositions of Media Presentation (CMP) Proposal Comparison", Oct. 15, 2010, 56 pgs. total, XP030046599.
Waqar Zia, "A few comments on LGE proposal about delivery of MPEG-2-TS", Oct. 15, 2010, 3 pgs. total, XP030047157.
Communication dated Feb. 12, 2014 issued by the European Patent Office in counterpart European Application No. 10830206.8.
Communication dated Feb. 12, 2014 issued by the European Patent Office in counterpart European Application No. 10830223.3.
Communication dated Feb. 25, 2014 issued by the European Patent Office in counterpart European Application No. 10830218.3.
Communication dated Mar. 4, 2014 issued by the European Patent Office in counterpart European Application No. 10830204.3.
Jaeyeon Song, et al., "Response to Call for Proposals for HTTP Streaming of MPEG Media standard", Jul. 30, 2010, 60 pgs. total, XP030046369.
Gerard Fernando, et al., "HTTP Streaming Solution-Response to Call for Proposal", Jul. 30, 2010, 32 pgs. total, XP030046346.
European Search Report dated Apr. 25, 2014 issued by the European Patent Office in counterpart European Application No. 10836186.6.
John A. Bocharov, "Smooth Streaming Technical Overview", CM-IPTV0560, Oct. 20, 2009, 18 pgs. total, XP017826991.
Communication dated Apr. 25, 2014 issued by the European Patent Office in counterpart European Application No. 11747701.8.
Communication dated Apr. 25, 2014 issued by the European Patent Office in counterpart European Application No. 11756585.3.
Communication dated Feb. 18, 2014 issued by the State Intellectual Property Office of P.R. China in counterpart Chinese Application No. 201080055449.8.
Communication dated Apr. 15, 2014 issued by the State Intellectual Property Office of P.R. China in counterpart Chinese Application No. 201080061413.0.
"Transparent End-to-End Packet-Switched Streaming Service (PSS); Protocols and Codecs (Release 9)", 3GPP TS 26.234, Mar. 2012, 188 pages total.
"Release 2 Specification HTTP Adaptive Streaming", Open IPTV Forum, Sep. 2010, 25 pages total.
Communication dated Nov. 3, 2014, issued by the State Intellectual Property Office of the People's Republic of China in counterpart Chinese Application No. 201180014696.8.
Communication dated Dec. 19, 2014, issued by the Japanese Patent Office in counterpart Japanese Application No. 2012-543023.
Communication dated May 22, 2014 issued by the European Patent Office in counterpart European Application No. 11790033.2.
Communication dated Jul. 2, 2014 issued by the State Intellectual Property Office of P.R. China in counterpart Chinese Application No. 201080061417.9.
Communication dated Jul. 3, 2014 issued by the State Intellectual Property Office of P.R. China in counterpart Chinese Application No. 201180010793.X.
Communication dated Jul. 1, 2014 issued by the Japanese Patent Office in counterpart Japanese Application No. 2012-538764.
Communication dated Jul. 15, 2014 issued by the Japanese Patent Office in counterpart Japanese Application No. 2012-538765.
Communication dated Mar. 24, 2015 issued by European Patent Office in counterpart European Application No. 11756585.3.
Communication dated May 18, 2015, issued by the State Intellectual Property Office of the People's Republic of China in counterpart Chinese Application No. 201080061494.4.
Communication dated Apr. 27, 2015 issued by the Japanese Patent Office in counterpart Japanese Patent Application No. 2012-538768.
Communication from the Japanese Patent Office dated Mar. 23, 2015 in a counterpart Japanese application No. 2012-553824.
Communication from the State Intellectual Property Office of P.R. China dated Mar. 17, 2015 in a counterpart application No. 201080061417.9.
Communication from the Japanese Patent Office dated Apr. 13, 2015 in a counterpart Japanese application No. 2012-538771.
Communication from the Japanese Patent Office dated Feb. 2, 2015 in a counterpart Japanese application No. 2012-538765.
Communication from the Japanese Patent Office dated Apr. 6, 2015 in a counterpart Japanese application No. 2012-538764.
Communication dated Jul. 9, 2015, issued by the State Intellectual Property Office of P.R. China in counterpart Chinese Application No. 201180014696.8.
Communication dated Aug. 13, 2015, issued by the State Intellectual Property Office of P.R. China in counterpart Chinese Application No. 201080061417.9.
Communication dated Aug. 5, 2015, issued by the State Intellectual Property Office of P.R. China in counterpart Chinese Application No. 201180027573.8.
Communication dated Dec. 4, 2015 issued by Chinese Intellectual Property Office in counterpart Chinese Patent Application No. 201080061494.4.

* cited by examiner

FIG. 4A

```
<Tracks>
   <Track ID="1" Type="Packed" BitRate="200000">
   <Track ID="2" Type="Video" BitRate="400000">
</Tracks>
```

FIG. 4B

```
<RefData Type="HEAD-TS" ID="1">
      <URL>http://www.altova.com/movie1/head1.ref</URL>
</RefData>
<RefData Type="HEAD-TS" ID="2">
      <URL>http://www.altova.com/movie1/head2.ref</URL>
</RefData>
```

FIG. 4C

```
<Fragments NextFragmentsXMLURL="http://www.altova.com/movie1/NextMeta.xml">
      <Fragment StartTime="14:20:00.0Z" Duration="00:00:02.0z" ID="1"
BitRate="200000">
            <URL>http://www.altova.com/movie1/slice1-1.as</URL>
            <RefPointer>1</RefPointer>
      <Fragment StartTime="14:20:00.0Z" Duration="00:00:02.0z" ID="1"
BitRate="400000">
            <URL>http://www.altova.com/movie1/slice2-1.as</URL>
            <RefPointer>2</RefPointer>
</Fragments>
```

FIG. 7

```
<Contents xsi:noNamespaceSchemaLocation="samsung_as.xsd" xmlns:xsi="http://www.w3.org/2001/XMLSchema-instance">
  <ContentItem>
    <Title xml:lang="en-us">Example</Title>
    <Synopsis xml:lang="en-us">String</Synopsis>
    <OriginSite>http://asexample.com</OriginSite>
    <OriginStateName>Example</OriginSiteName>
    <ContentID>18888</ContentID>
    <ContentURL VideoCoding="AVC" Duration="14:20:00.00" Size="0" MediaFormat="MP4" DRMSystemID="12" MD5Hash=
     "String" MIMIType="video/MP4"TransferType="AS-CoD" AudioCoding="AAC">http://asexample.com/vod/movies/18888/
      Meta/MainMeta.xml</ContentURL>
  </ContestItem>
</Contents>
```

FIG. 9A

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{Segment D}.as</URLTemplate>
    <RefDataURL>http://asexample.com/vod/movies/18888/References/header2.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Audio" Bitrate="64000" StartTime="00:00:00" SegmentDuration="00:00:30" SegmentStartID="1000" SegmentCount="120"/>
    <Track ID="5" Type="I-Frame" Bitrate="500000" StartTime="00:00:00" SegmentDuration="00:00:10" SegmentStartID="1000" SegmentCount="360"/>
</AdaptiveControl>
```

FIG. 9B

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{Segment D}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" Bitrate="64000" StartTime="10:00:00" SegmentDuration="00:00:30" SegmentStartID="1000" SegmentCount="2"/>
</AdaptiveControl>
```

FIG. 9C

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:01:00" SegmentDuration="00:00:06" SegmentStartID="1010" SegmentCount="10"/>
    <Track ID="2" Type="Video" Bitrate="1000000" StartTime="10:01:00" SegmentDuration="00:00:06" SegmentStartID="1010" SegmentCount="10"/>
    <Track ID="3" Type="Video" Bitrate="2000000" StartTime="10:01:00" SegmentDuration="00:00:06" SegmentStartID="1010" SegmentCount="10"/>
    <Track ID="4" Type="Audio" Bitrate="64000" StartTime="10:01:00" SegmentDuration="00:00:30" SegmentStartID="1010" SegmentCount="2"/>
</AdaptiveControl>
```

FIG. 9D

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="360"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9E

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="60"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9F

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track D="1" Type="Video" Bitrate="500000" StartTime="00:00:00" SegmentDuration="00:00:10" SegmentStartID="1000" SegmentCount="360"/>
    <Track D="2" Type="Video" Bitrate="1000000" StartTime="00:02:00" SegmentDuration="00:00:10" SegmentStartID="1000" SegmentCount="348"/>
    <Track D="3" Type="Video" Bitrate="2000000" StartTime="00:02:00" SegmentDuration="00:00:10" SegmentStartID="1000" SegmentCount="348"/>
    <Track D="4" Type="Video" Bitrate="3000000" StartTime="00:02:00" SegmentDuration="00:00:10" SegmentStartID="1000" SegmentCount="348"/>
    <Track D="5" Type="Video" Bitrate="4000000" StartTime="00:02:00" SegmentDuration="00:00:10" SegmentStartID="1000" SegmentCount="348"/>
    <Track D="6" Type="Audio" Bitrate="64000" StartTime="00:00:00" SegmentDuration="00:00:30" SegmentStartID="1000" SegmentCount="120"/>
</AdaptiveControl>
```

FIG. 9G

```
<AdaptiveControl xsi:noNamespaceSchemaLocation="samsung_as.xsd" xmlns:xsi="http://www.w3.org/2001/XMLSchema-instance">
    <NextAdaptiveControlURL>http://asexample.com/live/movies/18888/Meta/NextMeta.xml</NextAdaptiveControlURL>
    <Track ID="1" Type="Packed" BitRate="500000">
        <Segment StartTime="00:00:00.00" Duration="00:02:00.00" ID="1000">
            <URL>http://ad_server.com/ad_for_adaptive/ad1.ts</URL>
        </Segment>
    </Track>
</AdaptiveControl>
```

FIG. 9H

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" language="EN" Bitrate="64000" StartTime="10:00:00" SegmentDuration="00:00:30" SegmentStartID="1000" SegmentCount="2"/>
    <Track ID="5" Type="Audio" language="KR" Bitrate="64000" StartTime="10:00:00" SegmentDuration="00:00:30" SegmentStartID="1000" SegmentCount="2"/>
    <Track ID="6" Type="Subtitle" language="EN" Bitrate="0" StartTime="10:00:00" SegmentDuration="00:00:30" SegmentStartID="1000" SegmentCount="2"/>
    <Track ID="7" Type="Subtitle" language="KR" Bitrate="0" StartTime="10:00:00" SegmentDuration="00:00:30" SegmentStartID="1000" SegmentCount="2"/>
</AdaptiveControl>
```

FIG. 13A

```
<MPD type="OnDemand">
   <ProgramInformation/>
   <Period start="00:00:00">
      <Representation bandwidth="..." resolution="…" framerate="…" mimeType="...">
         <SegmentInfo duration="10">
            <Url sourceUrl="http://video.content.com/movie01/>
            ...
         </SegmentInfo>
      </Representation>
   </Period>
</MPD>
```

FIG. 13B

```
<MPD type="OnDemand">
   <ProgramInformation/>
   <Period start="00:00:00">
      <Representation bandwidth="..." resolution=" ..." framerate="CFR/30" mimeType="...">
         <SegmentInfo duration="10">
            <Url sourceUrl="http://video.content.com/movie01/>
            ...
         </SegmentInfo>
      </Representation>
   </Period>
</MPD>
```

FIG. 13C

```
<MPD type="OnDemand">
  <ProgramInformation/>
  <Period start="00:00:00">
    <Representation bandwidth="..." resolution=" ..." framerate="VFR/30" mimeType="...">
      <SegmentInfo duration="10">
        <Url sourceUrl="http://video.content.com/movie01/>
        ...
      </SegmentInfo>
    </Representation>
  </Period>
</MPD>
```

FIG. 13D

```
<MPD type="OnDemand">
  <ProgramInformation/>
  <Period start="00:00:00">
    <Representation bandwidth="..." resolution=" ..." framerate=" 30" mimeType='...">
      <SegmentInfo duration="10">
        <Url sourceUrl="http://video.content.com/movie01/>
        ...
      </SegmentInfo>
    </Representation>
  </Period>
</MPD>
```

FIG. 13E

```
<MPD type="OnDemand">
  <ProgramInformation/>
  <Period start="00:00:00">
    <Representation bandwidth='..." resolution=" ..." minframerate="30" maxframerate="60" mimeType="...'>
      <SegmentInfo duration="10">
        <Url sourceUrl="http://video.content.com/movie01/>
        ...
      </SegmentInfo>
    </Representation>
  </Period>
</MPD>
```

FIG. 13F

```
<MPD type="OnDemand">
  <ProgramInformation/>
  <Period start="00:00:00">
    <Representation bandwidth="CBR/250kbps" resolution=" ..." framerate=" ..." mimeType="...">
      <SegmentInfo duration="10">
        <Url sourceUrl="ht:p://video.content.com/movie01/>
        ...
      </SegmentInfo>
    </Representation>
  </Period>
</MPD>
```

FIG. 13G

```
<MPD type="OnDemand">
  <ProgramInformation/>
  <Period start="00:00:00">
    <Representation bandwidth="VBR/250kbps" resolution=" ..." framerate=" ..." mimeType="...">
      <SegmentInfo duration="10">
        <Url sourceUrl="http://video.content.com/movie01/>
        ...
      </SegmentInfo>
    </Representation>
  </Period>
</MPD>
```

FIG. 14A

```
<MPD type="OnDemand">
  <ProgramInformation/>
  <Period start="00:00:00" qualitydependency=" …">
    <Representation bandwidth="…" resolution=" …" framerate=" …" mimeType="…">
      <SegmentInfo duration="10">
        <Url sourceUrl="http://video.content.com/movie01/>
        …
      </SegmentInfo>
    </Representation>
  </Period>
</MPD>
```

FIG. 14B

```
<MPD type="OnDemand">
  <ProgramInformation/>
  <Period start="00:00:00" qualitydependency=" Resolution>Bandwidth>Framerate" >
    <Representation bandwidth="…" resolution=" …" framerate=" …" mimeType="…">
      <SegmentInfo duration="10">
        <Url sourceUrl="http://video.content.com/movie01/>
        …
      </SegmentInfo>
    </Representation>
  </Period>
</MPD>
```

FIG. 14C

```
<MPD type="OnDemand'>
    <ProgramInformation/>
    <Period start="00:00:00" qualitydependency=" 123" >
        <Representation bandwidth="..." resolution=" ..." framerate=" ..." mimeType="...">
            <SegmentInfo duration="10">
                <Url sourceUrl="http://video.content.com/movie01/>
                ...
            </SegmentInfo>
        </Representation>
    </Period>
</MPD>
```

FIG. 14D

```
<MPD type="OnDemand'>
    <ProgramInformation/>
    <Period start="00:00:00" qualitydependency=" Framerate" >
        <Representation bandwidth="..." resolution=" ..." framerate=" ..." mimeType="...">
            <SegmentInfo duration="10">
                <Url sourceUrl="http://video.content.com/movie01/>
                ...
            </SegmentInfo>
        </Representation>
    </Period>
</MPD>
```

FIG. 15

```
<?xml version="1.0" encoding="UTF-8"?>
<xs:schema targetNamespace="urn:3GPP:ns:PSS:AdaptiveHTTPStreamingMPD:2009"
. . .
<!-- MPD Type -->
. . .

<!-- Period of a presentation -->
<xs:complexType name="PeriodType">
    <xs:sequence>
        <xs:element minOccurs="0" name="SegmentInfoDefault" Type="SegmentInfoDefaultType"/>
        <xs:element maxOccurs="unbounded" name="Representation" type="RepresentationType"/>
        <xs:any namespace="##other" processContents="lax" minOccurs="0" maxOccurs="unbounded"/>
    </xs:sequence>
    <xs:attribute name="start" type="xs:duration"/>
    <xs:attribute name="id" type="xs:string"/>
    <xs:attribute name=" qualitydependency" type="xs:string"/>
    <xs:attribute default="false" name="segmentAlignmentFlag" type="xs:boolean"/>
    <xs:attribute default="false" name="bitStreamSwitchingFlag" type="xs:boolean"/>
    <xs:anyAttribute namespace="##other" processContents="lax"/>
</xs:complexType>
. . .

</xs:schema>
```

METHOD AND APPARATUS FOR ADAPTIVE STREAMING BASED ON PLURALITY OF ELEMENTS FOR DETERMINING QUALITY OF CONTENT

CROSS-REFERENCE TO RELATED PATENT APPLICATION

This application claims the benefit of U.S. provisional Patent Application No. 61/351,434, filed on Jun. 4, 2010, U.S. provisional Patent Application No. 61/356,641, filed on Jun. 20, 2010, and U.S. Provisional Patent Application No. 61/370,957, filed on Aug. 5, 2010, in the U.S. Patent and Trademark Office, and claims priority from Korean Patent Application No. 10-2011-0011110, filed on Feb. 8, 2011, in the Korean Intellectual Property Office, the disclosures of all of which are incorporated herein their entirety by reference.

BACKGROUND

1. Field

Methods and apparatuses consistent with exemplary embodiments related to adaptively streaming media data according to fluctuations in a streaming environment.

2. Description of the Related Art

Examples of a method of transmitting media data through a network include a downloading method and a streaming method. In the streaming method, a server transmits media data in real time, and a client reproduces the received media data in real time.

Unlike the downloading method that starts to reproduce media data after transmitting and receiving all of the media data, the streaming method involves reproducing the media data by transmitting and receiving the media data in real time through a logical channel set between the server and the client, so that a method and apparatus are required to maintain a Quality of Service (QoS) for reproduction of the media data by addressing fluctuations in the streaming environment.

SUMMARY

One or more embodiments may provide a method and apparatus for adaptively adjusting and performing streaming, that is, transmission and reception of media data, according to a streaming environment.

One or more embodiments may also provide a computer readable recording medium having recorded thereon a program for executing the method.

According to an aspect of an exemplary embodiment, there is provided a method of receiving media data, the method including receiving a file from a server, wherein the file includes information about a plurality of media data generated by encoding predetermined content with different qualities; and receiving at least one media data among the plurality of media data, based on the file, wherein the file includes a frame rate for each of the plurality of media data.

The file may include a plurality of first tags including at least one of a title, a type, a resolution, and a bit rate with respect to each of the plurality of media data, and the frame rate for each of the plurality of media data may be included in each of the plurality of first tags.

The file may include information about priority among a plurality of elements for determining the qualities, and the information about the priority among the plurality of elements may be included in a second tag that is an upper tag of the plurality of first tags.

The plurality of elements may include the resolution, the bit rate, and the frame rate.

The information about the priority among the plurality of elements may include signs that are respectively allocated to the plurality of elements and are arrayed according to a priority order.

The information about the priority among the plurality of elements may include information about one element having a highest priority from among the plurality of elements.

The operation of receiving the at least one media data may include the operation of selecting and receiving at least one media data of the plurality of media data, based on the information about the priority among the plurality of elements.

The second tag may define a reproduction period of the content.

Each of the plurality of media data may include at least one of a plurality of segments generated by encoding the content to have a predetermined quality and dividing the encoded content according to a time period.

According to another aspect of an exemplary embodiment, there is provided a method of transmitting media data, the method including the operations of transmitting a file to a client, wherein the file includes information about a plurality of media data generated by encoding predetermined content with different qualities; and transmitting at least one media data of the plurality of media data to the client, according to a request from the client based on the transmitted file, wherein the file includes a frame rate for each of the plurality of media data.

According to another aspect of an exemplary embodiment, there is provided a media data receiving apparatus including an information receiving unit for receiving a file from a server, wherein the file comprises information about a plurality of media data generated by encoding predetermined content with different qualities; and a media data receiving unit for receiving at least one media data of the plurality of media data, based on the file, wherein the file includes a frame rate for each of the plurality of media data.

According to another aspect of an exemplary embodiment, there is provided a media data transmitting apparatus including an information transmitting unit for transmitting a file to a client, wherein the file includes information about a plurality of media data generated by encoding predetermined content with different qualities; and a media data transmitting unit transmitting at least one media data of the plurality of media data to the client, according to a request from the client based on the transmitted file, wherein the file includes a frame rate for each of the plurality of media data.

According to another aspect of an exemplary embodiment, there is provided a computer readable recording medium having recorded thereon a program for executing the method of transmitting or receiving media data.

BRIEF DESCRIPTION OF THE DRAWINGS

The above and/or other aspects will become more apparent by describing in detail exemplary embodiments with reference to the attached drawings in which:

FIG. 4A illustrates information for defining a plurality of media data, according to an exemplary embodiment;

FIG. 4B illustrates information about a header of media data, according to an exemplary embodiment;

FIG. 4C illustrates information about at least one segment included in each of a plurality of media data, according to an exemplary embodiment;

FIG. 7 illustrates information about content according to an exemplary embodiment;

FIGS. 9A through 9H illustrate media presentation descriptions according to exemplary embodiments;

FIGS. 13A through 13G illustrate media presentation descriptions according to other exemplary embodiments;

FIGS. 14A through 14D illustrate media presentation descriptions according to other exemplary embodiments;

FIG. 15 is a schema of a media presentation description according to another exemplary embodiment;

DETAILED DESCRIPTION

Figure 1:
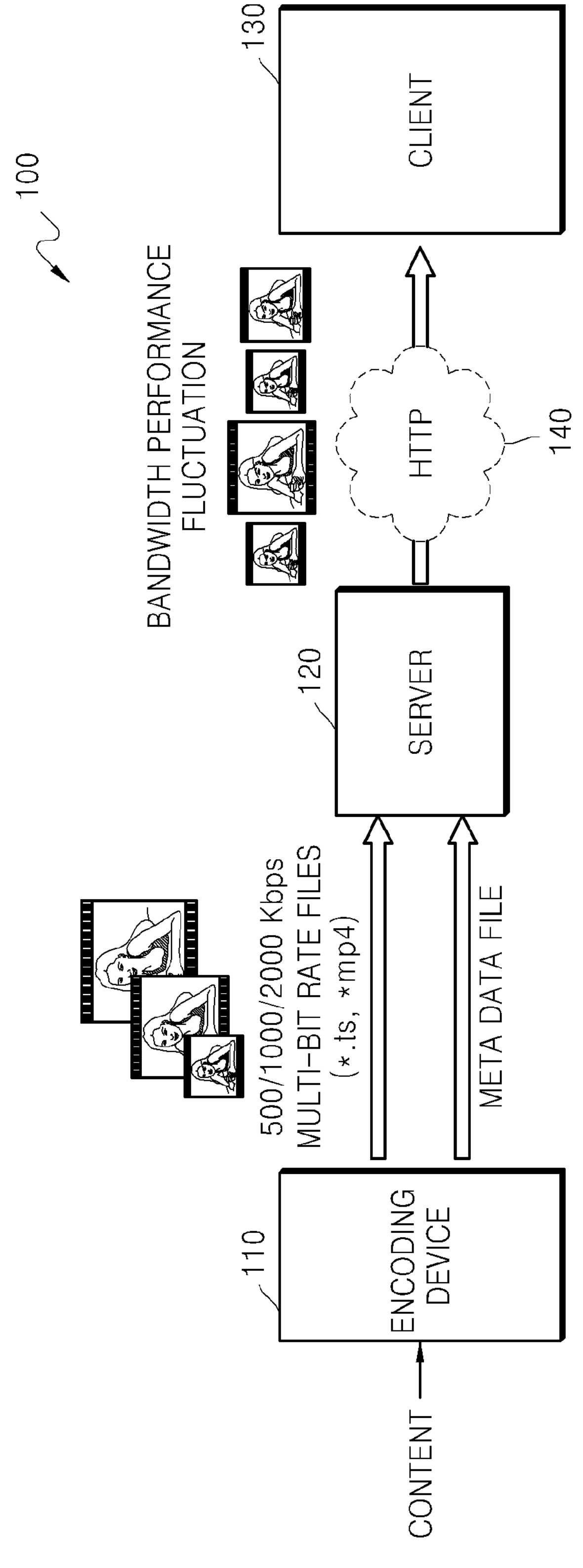
FIG. 1 is a diagram of a streaming system according to an exemplary embodiment.

Hereinafter, exemplary embodiments will be described more fully with reference to the accompanying drawings, in which like reference numerals refer to like elements throughout. Hereinafter, expressions such as "at least one of," when preceding a list of elements, modify the entire list of elements and do not modify the individual elements of the list.

FIG. 1 is a diagram of a streaming system 100 according to an exemplary embodiment.

Referring to FIG. 1, the streaming system 100 includes an encoding device 110, a server 120, and a client 130.

The encoding device 110 generates a plurality of media data corresponding to one input content by encoding the input content to have a plurality of different qualities. The streaming environment within which the server 120 streams media data to the client 130 may chance. For example, the bandwidth of a network 140 for streaming may change, or a hardware source that is used by the server 120 to transmit media data or by the client 130 to receive media data may change.

Accordingly, the encoding device 110 encodes one content to have different qualities to enable adaptive streaming according to a fluctuating streaming environment. One content may be encoded to have different qualities by adjusting a factor, such as at least one of a bit rate, a sampling frequency, a resolution, a frame rate, etc. For example, a plurality of media data in 500 Kbps, 1000 Kbps, and 2000 Kbps may be generated by encoding one image content by different resolutions.

The plurality of media data having different qualities are transmitted to the server 120. At this time, information about the content and information about each media data may also be transmitted to the server 120. The information about the content may include information about at least one of a title, a synopsis, a content identifier (ID), a content uniform resource locator (URL), etc., of the content as meta data of the content. The information about each media data may include at least one of a quality, a type, an ID, etc., of each media data, and will be described in detail below with reference to FIGS. 4A through 4C.

The client 130 receives at least one of the information about content and information about each media data, and transmits a request to the server 120 for at least one of the plurality of media data based on the received information. The client 130 determines or estimates a streaming environment, and selects at least one of the plurality of media data based on the estimated streaming environment. The at least one media data that may maintain a suitable quality of service (QoS) in the estimated streaming environment may be selected. Then, the client 130 may transmit a hypertext transfer protocol (HTTP) request requesting that the server 120 transmit the selected at least one media data.

When a streaming environment deteriorates and high quality media data is received but continuous reproduction of media data is not possible, low quality media data may be requested from among the plurality of media data. When a streaming environment improves and high quality media data is received and continuous reproduction of media data is possible, the high quality media data may continue to be requested from among the plurality of media data.

While receiving on media data, the client 130 may request that the server 120 transmit a different media data. For example, a client 130, which requested and is receiving first media data that is of low quality in a deteriorated streaming environment, may transmits a request to the server 120 to transmit second media data that is of a higher quality than the first media data as the streaming environment improves. According to a related art streaming method, after the server 120 and the client 130 set a quality while initially setting a streaming channel, media data is continuously transmitted and received having the same quality. However, according to the current exemplary embodiment, streaming that is adaptive to the streaming environment is possible since the client 130 is able to request the second media data even while receiving the first media data about the same content.

The client 130 may estimate a streaming environment by using any method of estimating a streaming environment based on, for example, at least one of the bandwidth of the network 140 and the hardware resources that may be used by at least one of the server 120 and the client 130. For example, the client 130 may estimate the streaming environment based on a time stamp and a bit error rate (BER) of received media data. The streaming environment may be determined to be deteriorated when media data is received slower than a reproduction speed by checking time stamps of the received media data. Alternatively, the streaming environment may be determined to be deteriorated when BERs of the received media data are increased.

When the client 130 requests the server 120 to transmit at least one of the media data according to the streaming environment, the server 120 transmits requested media data to the client 130. The server 120 may transmit the requested media data to the client 130 as an HTTP response to the HTTP request.

Each media data may include at least one of a plurality of segments generated by encoding content with different qualities and dividing the encoded content. In other words, each media data generated by encoding the content by the encoding device 110 may include at least one segment divided based on time. The server 120 transmits the content by dividing the content into the plurality of segments and respectively transmitting the plurality of segments, instead of encoding the content in one stream and continuously transmitting the content. The plurality of segments may be generated by dividing the content into predetermined time units, such as units of 10 or 20 seconds. The time that is the basis for dividing the content may be set based on a group of pictures (GOP). Media data corresponding to pictures of one or more GOPs may be set as one segment.

For example, when content is streamed having two qualities, the first media data may include at least one segment generated by encoding the content to have a first quality and dividing the encoded content based on time, and the second media data may include at least one segment generated by encoding the content to have a second quality and dividing the encoded content based on time.

The adaptive streaming is made possible by the dividing of the media data based on time. For example, when streaming starts, the server 120 transmits a segment corresponding to 0 to 20 seconds of the first media data that is of low quality. Then, when it is determined that the streaming environment is improved after 20 seconds and the client 130 requests media data that is of higher quality, the server 120 may transmit a segment corresponding to 20 to 40 seconds of the second media data that is of the high quality. Since media data is divided into a plurality of segments based on time, segments of different media data may be transmitted according to a streaming environment, even during streaming.

Figure 2A:
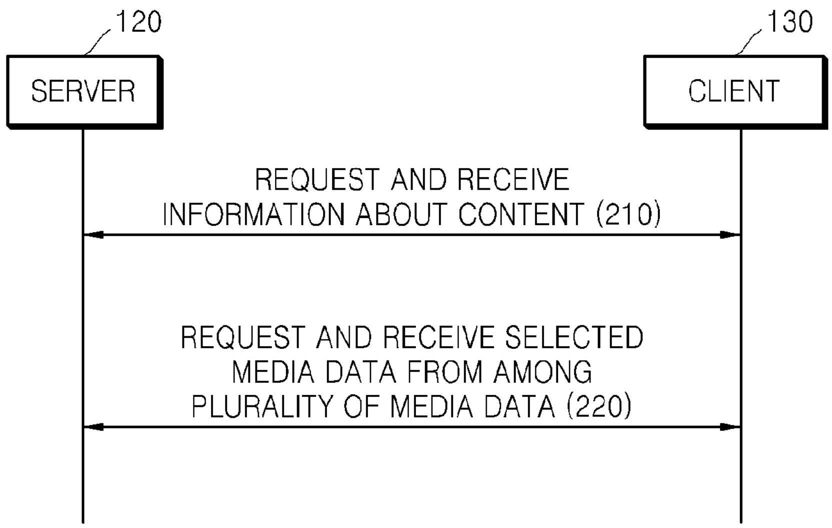
FIGS. 2A and 2B are flowcharts for describing streaming methods according to exemplary embodiments.

FIG. 2A is a flowchart for describing a streaming method according to an exemplary embodiment.

Referring to FIG. 2A, the client 130 transmits a request to the server 120 to transmit information about predetermined content, in operation 210. For example, when a user of the client 130 selects the predetermined content from a user interface displayed on a screen of the client 130, the client 130 transmits a request to the server 120 to transmit information about the selected content. The client 130 may transmit an HTTP request transmits a request to the server 120 to transmit information about predetermined content.

Upon receiving the request from the client 130, the server 120 transmits the information about the predetermined content to the client 130. The server 120 may transmit the information about the predetermined content as an HTTP response to the HTTP request of the client 130. The information about the predetermined content may be a content access descriptor (CAD) according to an open IPTV forum (OIPF) standard. The information about the predetermined content will now be described in detail with reference to FIG. 3.

Figure 3:
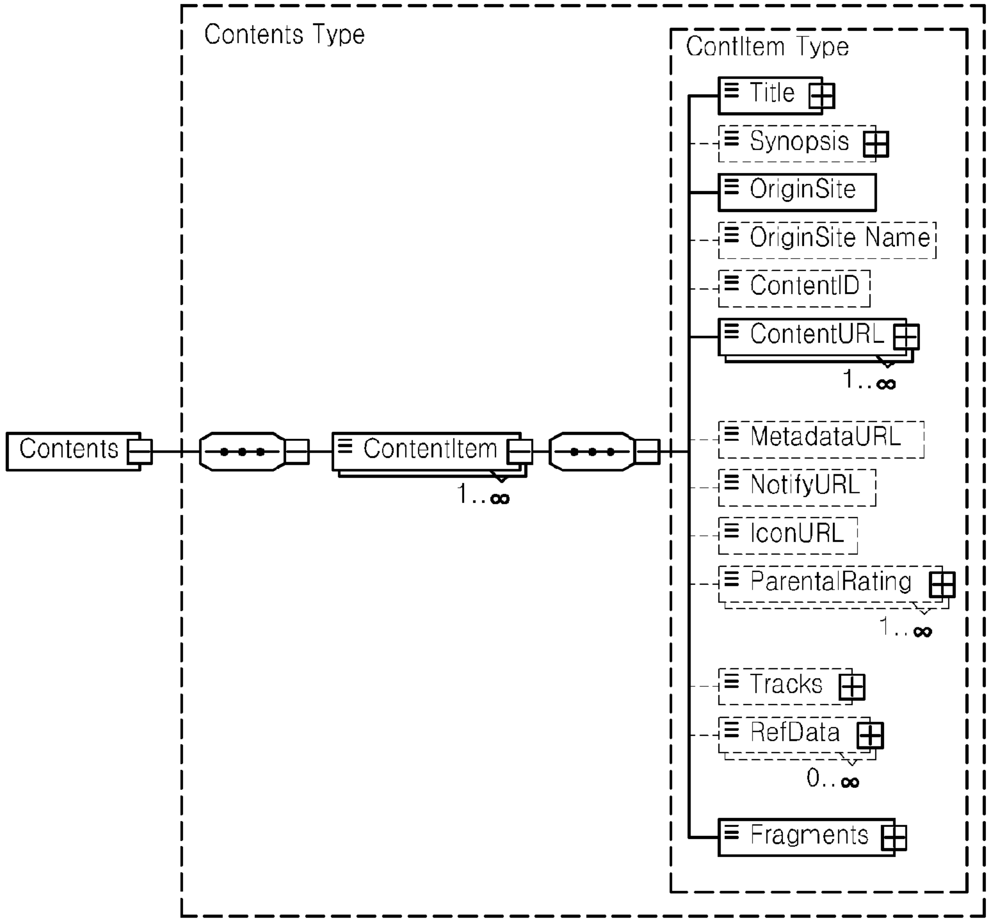
FIG. 3 is a schema of a file including information about content, according to an exemplary embodiment.

FIG. 3 is a schema of a file including information about content, according to an exemplary embodiment. The file may be a CAD, and may be an eXtensible Markup Language (XML) file. A tag and an attribute are separately described, but it would be obvious to one of ordinary skill in the art that an item defined by a tag can be defined by an attribute and an item defined by an attribute can be defined by a tag.

Referring to FIG. 3, the information about content may include "Title," "Synopsis," "OriginSite," and "ContentURL" tags.

Since related art streaming of media data generates one media data by encoding one content to have a predetermined quality, related art information (specifically, a CAD according to OIPF) about content does not include information about a plurality of media data generated by encoding the content to have different qualities.

However, the information about content, according to the current exemplary embodiment, includes information about a plurality of media data generated by encoding one content to have different qualities, and corresponds to "Tracks," "RefData," and "Fragments" tags in FIG. 3.

FIG. 4A illustrates information for defining a plurality of media data, according to an exemplary embodiment.

Referring to FIG. 4A, a "Tracks" tag is information for classifying a plurality of media data generated by encoding content to have different qualities. The "Tracks" tag includes an "ID" attribute, a "Type" attribute, and a "Bitrate" attribute assigned to each media data.

The "ID" attribute defines identifiers assigned (e.g., sequentially) to the plurality of media data, and the "Type" attribute defines whether media data corresponds to audio data, video data, audio/video data, or subtitle data. For example, when the "Type" attribute is "Packed," the media data is audio/video data, and when the "Type" attribute is "Video," the media data is video data. The "Bitrate" attribute defines a bit rate used to encode the media data.

FIG. 4B illustrates information about a header of media data, according to an exemplary embodiment.

Referring to FIG. 4B, a "RefData" tag includes a "Type" attribute and an "ID" attribute. The "Type" attribute defines a media format of a header. For example, when the "Type" attribute is "HEAD-TS," the header is a header of a transport stream format. The "ID" attribute defines a media data of a header. For example, when the "ID" attribute is "1," the header is a header of media data having a media data ID of "1." Also, the "RefData" tag includes information pointing to a header, and a "URL" tag defines a location of a header, i.e., a URL of a header.

The "RefData" tag is a selective element. That is, the "RefData" tag is included in information about content when a header is separated from media data and exists as a separate file, and may not be included in the information about content when the header is combined with the media data.

FIG. 4C illustrates information about at least one segment included in each of a plurality of media data, according to an exemplary embodiment.

Referring to FIG. 4C, a "Fragment" tag, which is a sub tag of a "Fragments" tag, includes the information about at least one segment included in each of the plurality of media data.

The "Fragments" tag includes a "NextFragmentsXMLURL" attribute. When following content is continuously streamed after streaming of one content is completed, as in the case of live streaming, the following content may be seamlessly streamed when the client 130 is aware of information about the following content. Accordingly, the "Fragments" tag defines the information about the following content as the "NextFragmentsXMLURL" attribute. URLs of the plurality of media data with respect to the following content may be defined as the "NextFragmentsXMLURL" attribute.

The "Fragment" tag includes information about at least one segment of current content. Referring to FIG. 4C, URL information of "slice 1-1.as" constituting a first segment generated by encoding content in a first quality as first media data is defined by a "URL" tag, and an ID of a corresponding header is defined by a "RefPointer" tag. Also, a starting time of the first segment is defined by a "StartTime" attribute, and a duration time of each segment is defined by a "Duration" attribute. A quality of the first media data is defined by a "BitRate" attribute.

In FIG. 4C, the "Fragments" tag shows each media data including only one segment. However, as described above with reference to FIG. 1, it would be obvious to one of ordinary skill in the art that when each media data is divided into a plurality of segments, one "Fragments" tag may include information about at least two segments.

Referring back to FIG. 2A, the client 130 transmits a request to the server 120 to transmit at least one of the plurality of media data, in operation 220. The plurality of media data are generated by encoding one content to have different qualities. The client 130 selects at least one media data encoded to have a quality suitable for a streaming environment from among the plurality of media data, and requests the server 120 for the selected at least one media data. The client 130 may transmit an HTTP request to the server 120 based on information about the plurality of media data, which is included in the information about the content.

As described above with reference to FIG. 4C, the information about the content may include a "Fragments" tag. In this case, the client 130 requests the server 120 to transmit selected media data based on URL information included in the "Fragments" tag.

The server 120 transmits the media data according to the request of the client 130. The server 120 may transmit at least one segment of the requested media data to the client 130. The server 120 may transmit the requested media data as an HTTP response with respect to an HTTP request to the client 130.

Figure 2B:
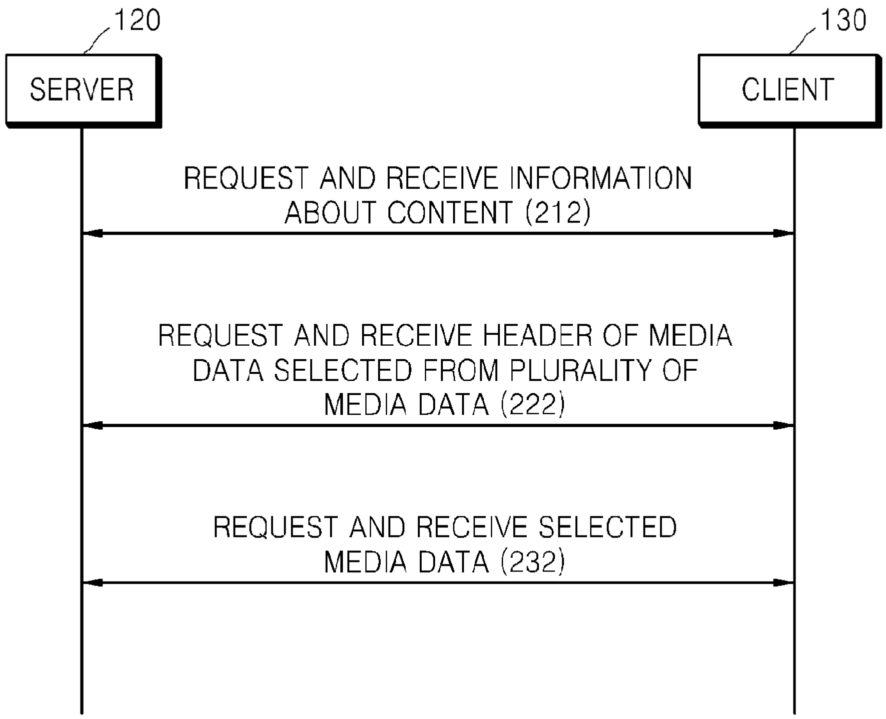

FIG. 2B is a flowchart for describing a streaming method according to another exemplary embodiment. FIG. 2B illustrates the streaming method when a header exists as a separate file from media data.

Referring to FIG. 2B, the client 130 requests the server 120 to transmit information about predetermined content, in operation 212, and the server 120 transmits the information about the content. Operation 212 corresponds to operation 210 of FIG. 2A. As an example, information about content including the "RefData" tag described above with reference to FIG. 4B is received.

In operation 222, the client 130 requests a header of selected media data from among a plurality of media data, based on the information about content received in operation 212. At least one media data suitable for a streaming environment is selected from among the plurality of media data based on the information about content received in operation 212, and a header of the selected at least one media data is requested. For example, the header of the selected at least one media data is requested by referring to the "RefData" tag included in the information about content received in operation 212.

The server 120 transmits the requested header to the client 130. A header file may be transmitted to the client 130 as an XML file.

In operation 232, the client 130 requests the server 120 to transmit selected media data based on the information about content received in operation 212 and the header received in operation 222. The client 130 requests the server 120 to transmit at least one segment generated by dividing media data based on time, and the server 120 transmits the requested at least one segment to the client 130.

Figure 5A:
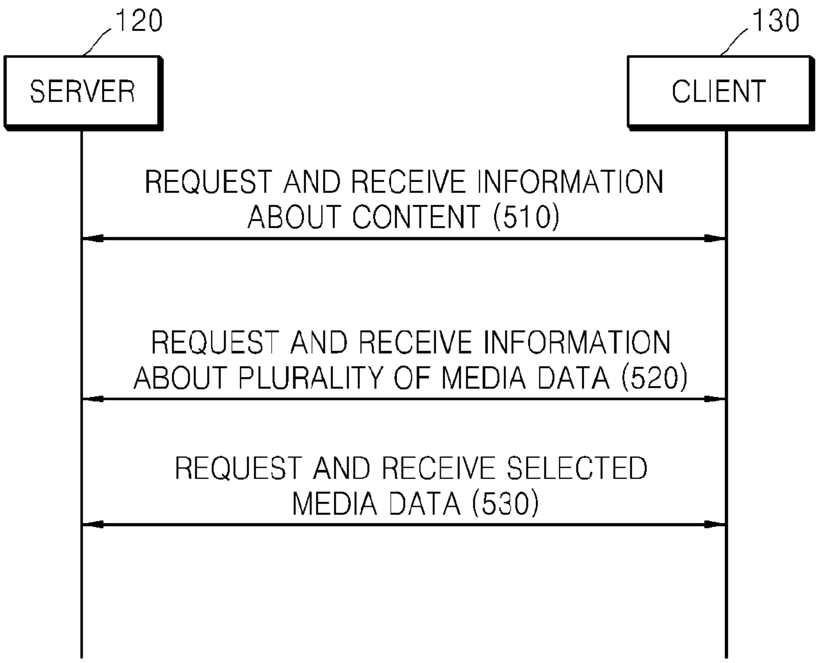
FIGS. 5A and 5B are flowcharts for describing streaming methods according to other exemplary embodiments.

FIG. 5A is a flowchart for describing a streaming method according to another exemplary embodiment.

Referring to FIG. 5A, the client 130 transmits a request to the server 120 to transmit information about predetermined content in operation 510, and the server 120 transmits the information about predetermined content. For example, the client 130 transmits an HTTP request for requesting that the server 120 transmit the information about content, and receives the information about content as an HTTP response to the HTTP request. The information about content may be an XML file. The information about content received by the client 130 in operation 510 is different from the information about content received by client 130 in operation 210 of FIG. 2, as will now be described with reference to FIGS. 6 and 7.

Figure 6:
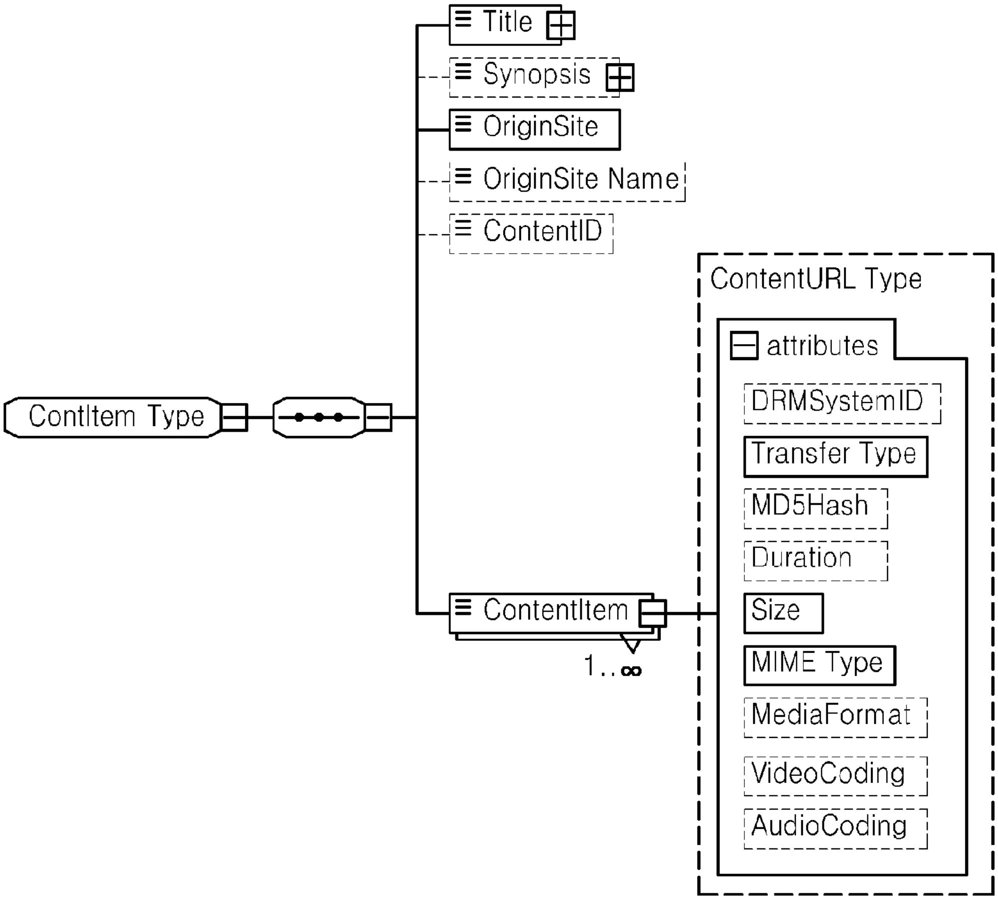
FIG. 6 is a schema of a file including information about content, according to another exemplary embodiment.

FIG. 6 is a schema of a file including information about content, according to another exemplary embodiment.

Referring to FIG. 6, the information about content according to the current exemplary embodiment may include "Title," "Synopsis," "OriginSite," and "ContentURL" tags, as in FIG. 3.

However, in FIG. 3, the information about content includes the information about the plurality of media data by including the "Tracks," "RefData," and "Fragments" tags, whereas in FIG. 6, instead of including the information about the plurality of media data, the information about content defines a URL of a file (hereinafter, referred to as a media presentation description) including the information about the plurality of media data. The "ContentURL" tag may define the URL of the media presentation description.

Compatibility with various media data formats may be maintained while performing streaming that is adaptive to a streaming environment by inserting the URL of the media presentation description into the information about content as shown in FIG. 6, without largely changing related art schema of the file containing the information about content.

As shown in FIG. 6, the information about content may include information related to the streaming method, and not include the information about the plurality of media data. In other words, the "ContentURL" tag may include a "MediaFormat" attribute defining a format of media data used during streaming, and a "MIMEType" attribute defining a type of media data.

Specifically, the "ContentURL" tag may include a "TransferType" attribute defining a service to which streaming of content is related. For example, the "TransferType" attribute may define whether the streaming of content is related to a Content on Delivery (CoD) service, a live service, an adaptive streaming live service, an adaptive streaming CoD service, etc.

FIG. 7 illustrates information about content according to an exemplary embodiment. FIG. 7 may be a CAD according to the OIPF standard.

Referring to FIG. 7, the information about content generated according to the schema of FIG. 6 may define a URL of a media presentation description in a "ContentURL" tag. "http://asexample.com/vod/movies/18888/Meta/MainMeta.xml" is the URL of the media presentation description. Also, as described with reference to FIG. 6, the "MediaFormat" attribute, the "MIMEType" attribute, and the "TransferType" attribute may be defined in the "ContentURL" tag.

Referring back to FIG. 5A, in operation 520, the client 130 transmits a request to the server 120 for the information about the plurality of media data, based on the information about content received in operation 510. The client 130 may request a media presentation description from the server 120 through an HTTP request, and may receive the media presentation description as an HTTP response.

The information about content received by the client 130 from the server 120 in operation 510 may include the URL of the media presentation description as described with reference to FIGS. 6 and 7. In this case, the client 130 requests and receives the media presentation description from the server 120 by referring to the "ContentURL" tag of the information about content. The media presentation description will now be described in detail with reference to FIGS. 8A and 8B, and FIGS. 9A through 9H.

Figure 8A:
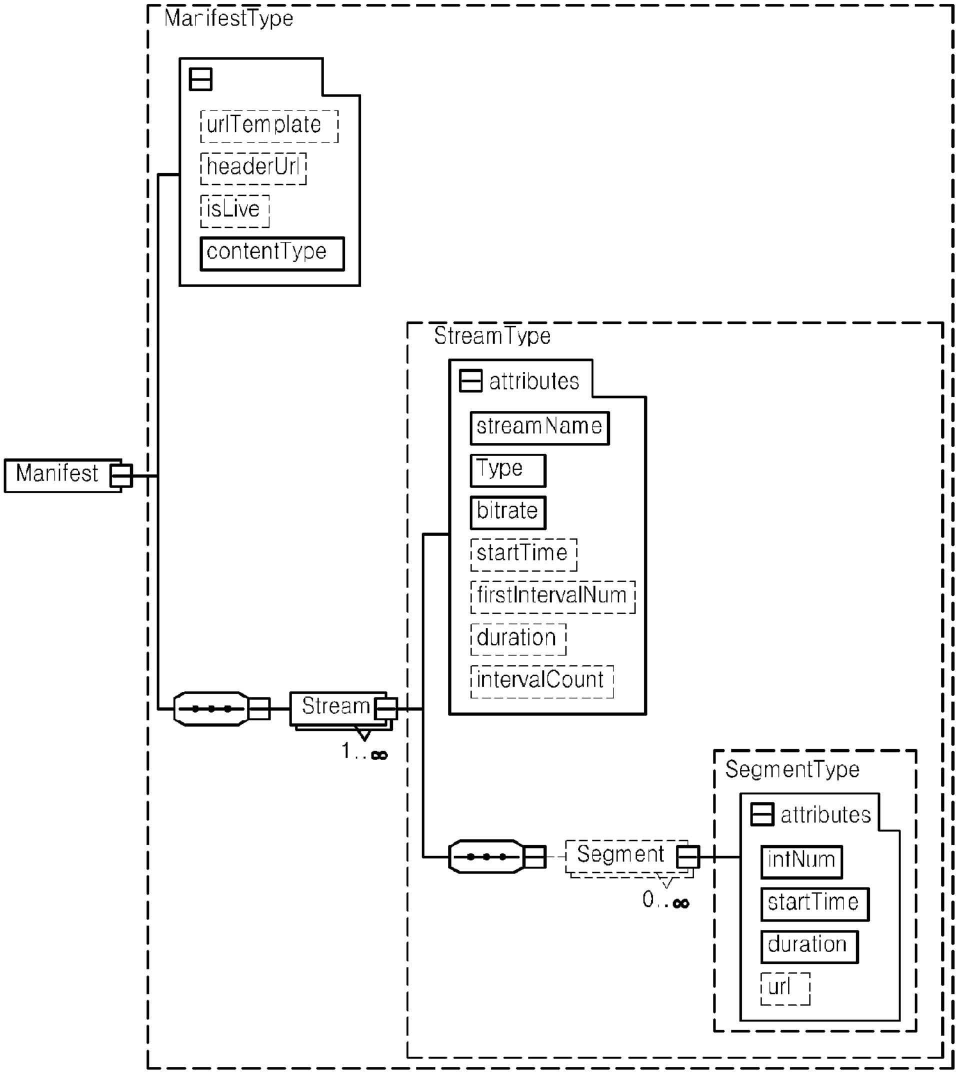
FIGS. 8A and 8B are schemas of a media presentation description according to exemplary embodiments.
Figure 8B:
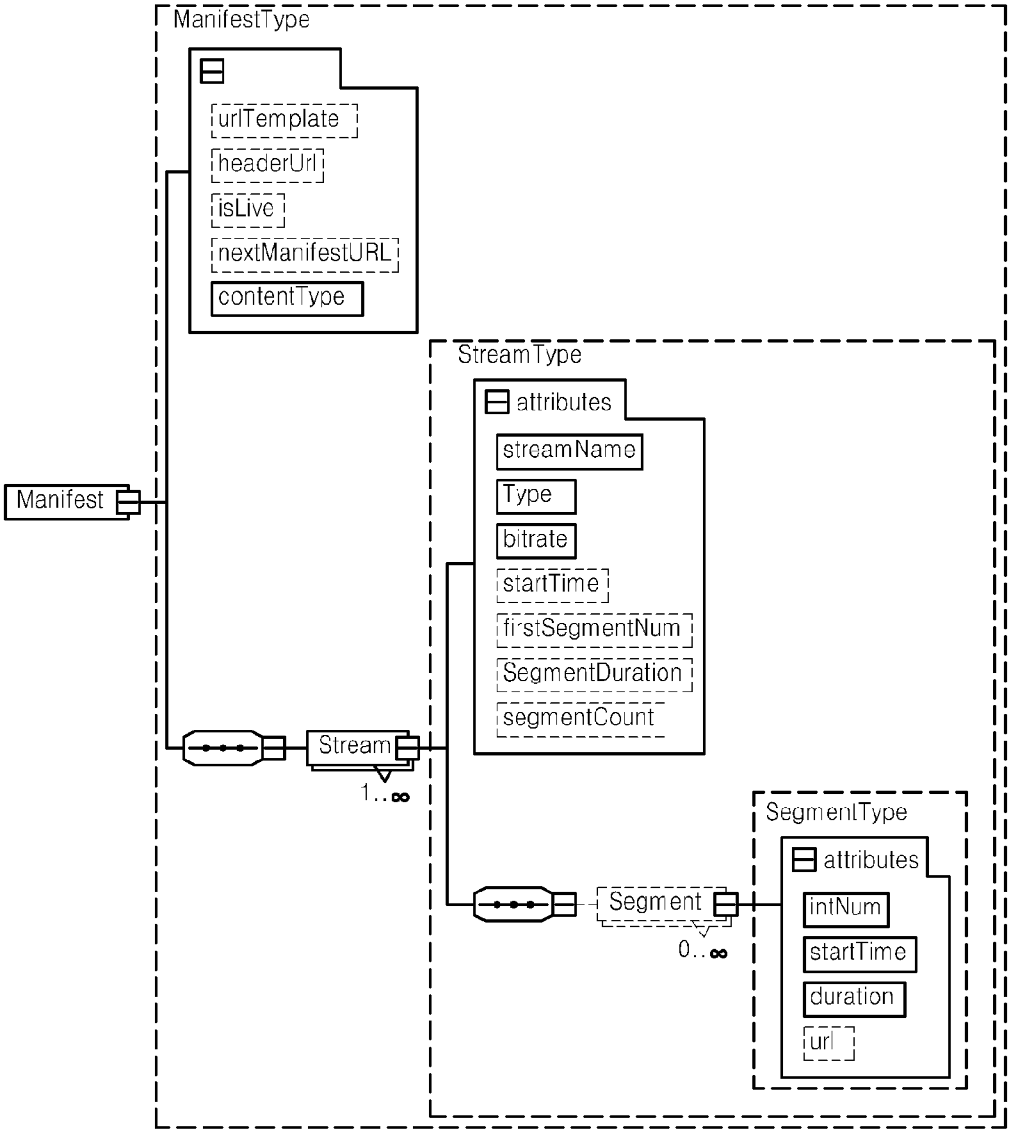

FIGS. 8A and 8B are schemas of a media presentation description according to exemplary embodiments. The media presentation description may comply with the OIPF standard.

Referring to FIG. 8A, the media presentation description according to the current exemplary embodiment includes a template tag about URLs of a plurality of media data, a tag for defining a location of a header, a tag for defining to which service the streaming is related to, a tag for defining a container format of media data, and a tag for defining the plurality of media data.

A "urlTemplate" tag defines a common portion of the URLs of the plurality of media data. For example, if "http://example.com/vod/movie/18888/Track/{TrackID}/ Segments/{SegmentID}" is a URL template, a URL of media data may be defined by respectively substituting an ID of each media data and an ID of at least one segment included in each media data for "TrackID" and "SegmentID."

A "headerUrl" tag corresponds to the "RefData" tag described with reference to FIG. 4B. In other words, the "headerUrl" tag defines URLs of headers of the plurality of media data.

An "is Live" tag defines a service related to streaming. For example, when the "is Live" tag is defined as "Live," the streaming is related to a live service, and when the "is Live" tag is defined as "CoD," the streaming is related to a CoD service.

A "contentType" tag defines a container format of media data used during streaming. The "contentType" tag may indicate whether the container format is an MP4 format or an MPEG2-TS format. The container format is an MP4 format or an MPEG2-TS format herein, though it is understood to one of ordinary skill in the art that the container format is not limited thereto, and any container format for transmitting media data may be used. For example, the "contentType" tag may define that the container format complies with an MPEG Media Transport (MMT) standard.

A "Stream" tag is generated for each media data and defines each media data. In order to define each media data generated by encoding one content to have different qualities, the "Stream" tag includes a "streamName" attribute, a "type" attribute, a "bitrate" attribute, a "startTime" attribute, a "firstIntervalNum" attribute, a "duration" attribute, and an "intervalCount" attribute.

The "streamName" attribute defines a name of media data, and may be an ID of media data. The "type" attribute defines a type of media data, for example, as audio data, video data, or audio/video data. When media data only includes data about an I-frame for a trick play, such information may be defined in the "type" attribute.

The "Bitrate" attribute defines a bit rate of media data, the "startTime" attribute defines a time stamp for specifying a starting time of media data, and the "firstIntervalNum" attribute defines a number of a segment that initially starts.

The "duration" attribute defines a duration time of a segment included in media data, and the "intervalCount" attribute defines a total number of at least one segment included in media data.

The "Segment" tag is a sub tag of the "Stream" tag, and as described above, when media data includes at least one segment generated by encoding content in a predetermined quality and dividing the encoded content based on time, each of the at least one segment is defined.

The "IntNum" attribute defines a number of a segment, and the "StartTime" tag defines a starting time of a corresponding segment. The "Duration" tag defines a duration time of a corresponding segment, and the "url" defines a URL of a corresponding segment.

The "Segment" tag may be a selective tag, and may not be included in the media presentation description if the information about at least one segment included in the media data can be inferred from other attributes of the "Stream" tag. In other words, when content of the "Segment" tag can be inferred from the "startTime," "firstIntervalNum," "duration," and "intervalCount" attributes defined in the "Stream" tag, the "Segment" tag may not be included in the media presentation description. Also, a "url" attribute of the "Segment" tag may not be included if a predetermined template is defined in the "urlTemplate," and the URLs of segments are inferred by substituting each ID of the plurality of media data and an ID of at least one segment included in each media data with the defined predetermined template.

Referring to FIG. 8B, the media presentation description according to another exemplary embodiment may further include a "nextManifestURL" tag. As described above, when following content is continuously streamed after streaming of one content is completed, such as in the case of live streaming or advertisement insertion, the client 130 previously knows information about the following content so as to stream the following content seamlessly. Accordingly, a URL of a media presentation description of the following content to be streamed after current content may be defined by the "nextManifestURL" tag.

FIGS. 9A through 9H illustrate media presentation descriptions according to exemplary embodiments.

Referring to FIG. 9A, the media presentation description according to an exemplary embodiment includes a "URLTemplate" tag, a "RefDataURL" tag, and a plurality of tags respectively defining a plurality of media data.

The "URLTemplate" tag and the "RefDataURL" tag of FIG. 9A respectively correspond to the "urlTemplate" tag and the "RefDataURL" tag of FIGS. 8A and 8B.

An "ID" attribute, a "Type" attribute, a "BitRate" attribute, a "StartTime" attribute, a "SegmentDuration" attribute, a "SegmentStartID" attribute, and a "SegmentCount" attribute of FIG. 9A respectively correspond to the "streamName" attribute, the "type" attribute, the "bitrate" attribute, the "startTime" attribute, the "duration" attribute of the "Stream" tag, the "firstIntervalNum" attribute of the "Stream" tag, and the "intervalCount" attribute of FIGS. 8A and 8B.

The media presentation description of FIG. 9A includes information about three video data generated by encoding content to have different qualities, information about one audio data, and information about media data generated by encoding only I-frames for a trick play.

Referring to FIG. 9B, the media presentation description according to an exemplary embodiment further includes a "NextAdaptiveControlURL" tag. The "NextAdaptiveControlURL" tag corresponds to the "nextManifestURL" tag of FIG. 8B. Accordingly, a URL of a media presentation description of following content to be reproduced after current content may be defined by the "NextAdaptiveControlURL" tag.

FIG. 9C shows a media presentation description of the following content, when the URL of the media presentation description of the following content to be reproduced after the current content is defined by the "NextAdaptiveControlURL" tag of FIG. 9B. Comparing the media presentation descriptions of FIGS. 9B and 9C, it can be seen that a "StartTime" attribute is different from the media presentation description of the current content of FIG. 9B, since the media presentation description of FIG. 9C is for the following content.

FIGS. 9D and 9E illustrate media presentation descriptions for selectively controlling high quality video reproduction that a user wants to perform according to an exemplary embodiment. FIG. 9D illustrates the media presentation description when a plurality of media data are generated by encoding one content to have 5 different qualities. Here, the media presentation descriptions of FIGS. 9D and 9E are different in a tag including information about video encoded to have high quality, i.e., a "StartTime" attribute and a "SegmentCount" attribute of media data having an "ID" attribute of "5".

In the present exemplary embodiment, the server 120 selectively transmits the media presentation description of FIG. 9D or the media presentation description of FIG. 9E according to a user rating of the client 130. When the user rating of the client 130 is high (for example, when the client 130 is a paid user), the media presentation description of FIG. 9D is transmitted so that high quality video is freely reproduced, and when the user rating of the client 130 is low (for example, when the client 130 is a free user), the media presentation description of FIG. 9E is transmitted so that segments defined by the "SegmentCount" attribute are reproduced from a time defined by the "StartTime" attribute in high quality video.

FIG. 9F illustrates a media presentation description when an advertisement is inserted into content according to an exemplary embodiment. Referring to FIG. 9F, the media presentation description may include information about advertisement content and main content, which have different "StartTime" attributes. The media presentation description may include information about advertisement content, which is reproduced from "00:00:00" to "00:02:00" at a bit rate of "500000," and information about main content, which is reproduced from "00:02:00" at bit rates of "1000000," "2000000," "3000000," or "4000000." The media presentation description of FIG. 9F may be transmitted from the server 120 to the client 130 if the server 120 provides the advertisement content to the client 130 by encoding the advertisement content to have one bit rate, and provides the main content, which have a different "StartTime" attribute from the advertisement content, to the client 130 by encoding the main content in four different bit rates.

FIG. 9G illustrates a media presentation description including information about advertisement content, according to an exemplary embodiment. A server for providing main content and a server for providing advertisement content may be different. For example, when the client 130 receives the main content from the server 120 of FIG. 5A and receives the advertisement content from a server other than the server 120, the media presentation description of FIG. 9G may include a URL of the advertisement content. As shown in FIG. 9G, the media presentation description may include the URL of the advertisement content that is encoded to have one quality.

A method and apparatus for reproducing the advertisement content by inserting the advertisement content into the main content while streaming the main content according to various exemplary embodiments will be described below with reference to FIGS. 13A through 23.

FIG. 9H illustrates a media presentation description including language and subtitle information, according to an exemplary embodiment. Referring to FIG. 9H, audio data may include information about multiple languages. The media presentation description may include information about audio data of multiple languages, wherein an "ID" attribute is "4" or "5," or information about subtitles of multiple languages, wherein the "ID" attribute is "6" or "7."

Since not only the audio data, but also the subtitle may be divided into a plurality of segments according to time, the audio data and the subtitle may be changed to audio data and a subtitle of another language during streaming.

Referring back to FIG. 5A, the client 130 transmits a request to the server 120 to transmit at least one of the plurality of media data, in operation 530. The client 130 selects at least one media data that is encoded to have a quality suitable for the streaming environment by referring to the information about the plurality of media data, and requests the server 120 for the selected at least one media data. The client 130 may transmit an HTTP request for requesting the server 120 to transmit a predetermined media data. The server 120 transmits the media data according to the request of the client 130. Alternatively, the server may transmit, to the client 130, at least one segment generated by encoding content to have a predetermined quality and dividing the encoded content based on time. The server 120 may transmit the requested media data to the client 130 as an HTTP response to the HTTP request.

Figure 5B:
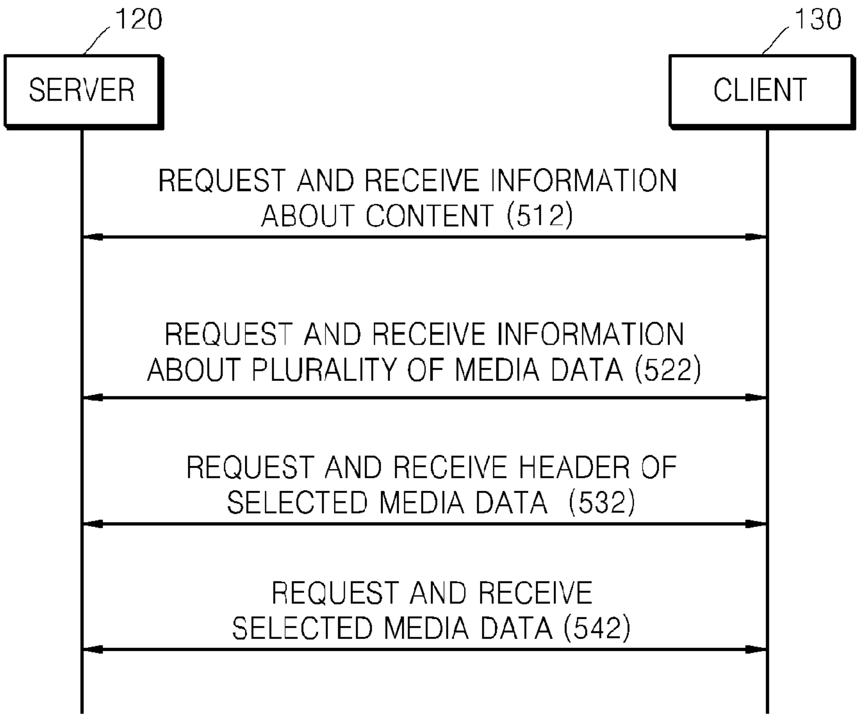

FIG. 5B is a flowchart for describing a streaming method according to another exemplary embodiment.

Referring to FIG. 5B, the client 130 transmits a request to the server 120 to transmit information about predetermined content in operation 512, and receives the information about predetermined content from the server 120. For example, the client 130 may transit an HTTP request for requesting the server 120 to transmit the information about predetermined content, and receive the information about predetermined content as an HTTP response to the HTTP request. The information about predetermined content may be included in an XML file. In operation 522, the client 130 transmits a request to the server 120 to transmit information about a plurality of media data based on the information about predetermined content received in operation 512. For example, the client 130 may transmits a request to the server 120 for a media presentation description through the HTTP request, and receive the media presentation description as the HTTP response.

In operation 532, the client 130 requests a header of media data selected based on the information about a plurality of media data received in operation 522. At least one media data that is suitable to a streaming environment is selected from among the plurality of media data based on the information about the plurality of media data received in operation 522, and a header of the selected at least one media data is requested. The header of the selected at least one media data is requested by referring to the information about the plurality of media data received in operation 522. The server 120 transmits a file of the header of the selected at least one media data to the client 130 in response to the request of the client 130. In operation 542, the client 130 transmits a request to the server 120 to transmit selected media data based on the information about the plurality of media data received in operation 522, and the header received in operation 532. The client 130 transmits a request to the server 120 to transmit at least one segment generated by encoding content to have a predetermined quality and dividing the encoded content based on time, and the server 120 transmits the requested at least one segment to the client 130.

Figure 10A:
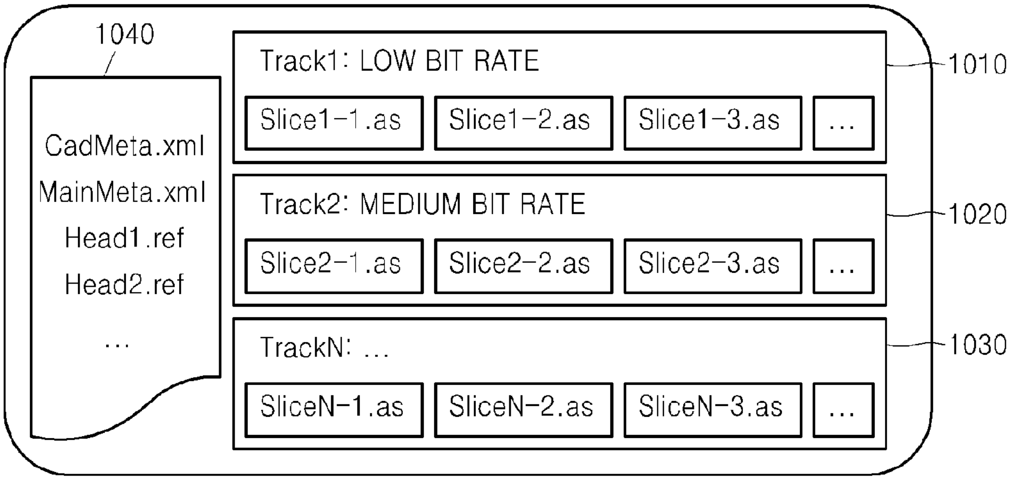
FIGS. 10A through 10C each illustrate a plurality of media data according to exemplary embodiments.
Figure 10B:
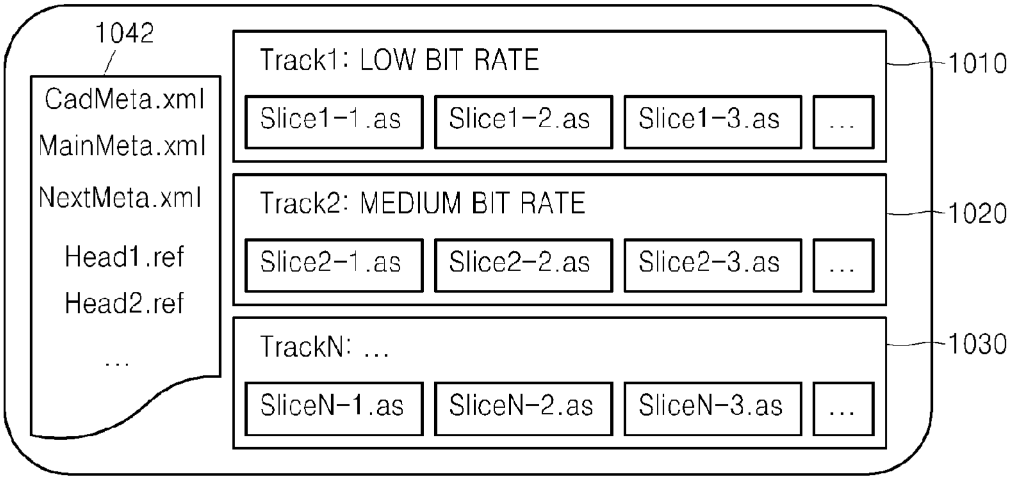
Figure 10C:
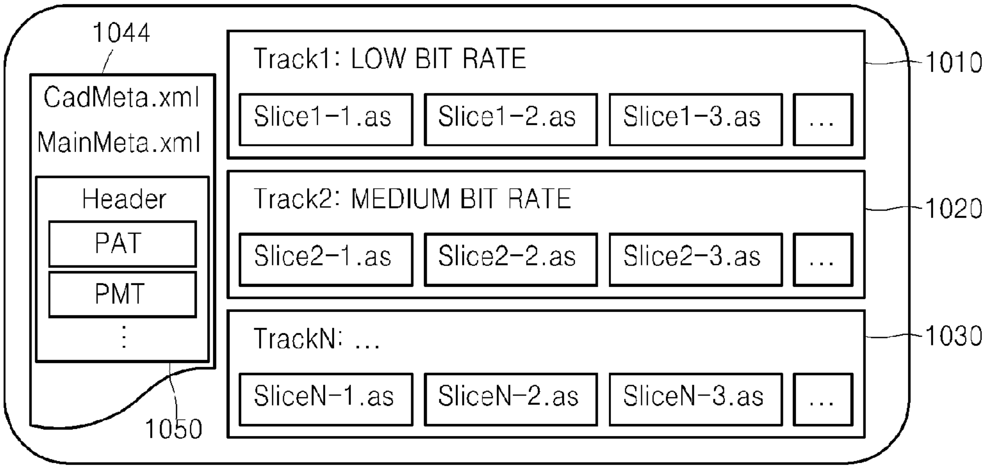

FIGS. 10A through 10C each illustrate a plurality of media data according to exemplary embodiments. For example, FIGS. 10A through 10C each illustrate the plurality of media data included in the server 120 to perform the streaming methods according to FIGS. 5A and 5B.

Referring to FIG. 10A, the server 120 may include a plurality of media data 1010 through 1030 generated by encoding one content to have a plurality of different qualities, for streaming that is adaptive to a streaming environment. "Track1" through "TrackN" denote the plurality of media data 1010 through 1030. Also, each of the plurality of media data 1010 through 1030 may include at least one segment generated by dividing each of the plurality of media data 1010 through 1030 based on time. "Slice1-1.as," "Slice1-2.as,"

"Slice1-3.as," "Slice2-1.as," "Slice2-2.as," "Slice2-3.as," "SliceN-1.as," "SliceN-2.as," and "SliceN-3.as" denote at least one segment.

The server 120 may include information 1040 used by the client 130 to access the plurality of media data 1010 through 1030. The server 120 may include a "CadMeta.xml" file as information about content, a "MainMeta.xml" file as information about the plurality of media data 1010 through 1030, and a "Head1.ref" file, a "Head2.ref" file, etc., as header files of the plurality of media data 1010 through 1030. Here, the "Head1.ref" file may be a header file of the "Track1," and the "Head2.ref" file may be a header file of the "Track2."

The "CadMeta.xml" file may be a CAD file according to the OIPF standard, and the "MainMeta.xml" file may be the media presentation description described above. Also, the "Head1.ref" and "Head2.ref" files are selective elements, and may not exist when headers are included in the plurality of media data 1010 through 1030.

Referring to FIG. 10B, information 1042 used by the client 130 to access the plurality of media data 1010 through 1030 may further include a "NextMeta.xml" file. As described above, the "NextMeta.xml" file may be a media presentation description of a following content to be reproduced after current content. As described above, the media presentation description of the current content, i.e., the "MainMeta.xml" file, includes the URL of the media presentation description of the following content, and thus the client 130 may access the "NextMeta.xml" file based on the "MainMeta.xml" file.

Referring to FIG. 10C, header files of the plurality of media data 1010 through 1030 may exist in one header file 1050. Instead of existing for each of the plurality of media data 1010 through 1030, the header files may exist as one header file 1050 and may be included in information 1044 used to access the plurality of media data 1010 through 1030.

For example, when each of the plurality of media data 1010 through 1030 corresponds to an elementary stream, such as an elementary stream according to MPEG-2, the header files of the plurality of media data 1010 through 1030 may be the header file 1050 including a program association table (PAT) and a program map table (PMT). At least one of the PAT and the PMT is separated from the plurality of media data 1010 through 1030 to prepare the header file 1050, and the media presentation description may include information pointing to the header file 1050. For example, the information pointing to the header file 1050 may be URL information of the header file 1050 or information specifying a packet including the header file 1050 in an MPEG-2 transport stream (TS). The header file 1050 including at least one of the PAT and the PMT is an initialization segment, and may be transmitted to the client 130 before segments including payload data, so as to initiate reproduction of the plurality of media data 1010 through 1030.

Referring back to operation 532 of FIG. 5B, the client 130 may obtain the information pointing to the header file 1050 by referring to the media presentation description, and may request the header file 1050 based on the information pointing the header file 1050. After requesting and receiving the header file 1050 based on the information pointing to the header file 1050, at least one of the plurality of media data 1010 through 1030 is selected based on at least one of the PAT and the PMT included in the header file 1050, and the selected at least one media data is requested from the server 120. The PAT and the PMT may be separated as the header file 1050 or included in the plurality of media data 1010 through 1030, and may include an entire list of elementary streams included in the plurality of media data 1010 through 1030 regardless of locations of the PAT and the PMT.

According to MPEG-2, packet IDs (PIDs) defined in the PAT and the PMT are different according to elementary streams. Accordingly, PIDs assigned to each of the plurality of media data 1010 through 1030 may be different. Alternatively, according to another exemplary embodiment, since the plurality of media data 1010 through 1030 generated by encoding one content to have different qualities are elementary streams of the same content, the same PID may be set.

When the plurality of media data 1010 through 1030 correspond to a plurality of elementary streams according to MPEG-2, each of segments included in the plurality of media data 1010 through 1030 may include at least one continuous packetized elementary stream (PES). However, one PES is included in one segment. In other words, one PES is not included in two different segments.

Since a plurality of media data are generated by encoding one content to have different qualities, at least one of presentation time stamps (PTSs) and decoding time stamps (DTSs) included in PESs of the plurality of media data may be aligned according to reproduction times. In other words, if an initial PES of first media data and an initial PES of second media data are content reproduced at the same time, at least one of a PTS and a DTS may be equally set.

Further, when the second media data is reproduced while reproducing the first media data by changing media data according to the streaming environment, at least one of the PTSs and the DTSs may be continuously aligned so that the first and second media data are continuously reproduced. In other words, when the second media data is reproduced while reproducing the first media data by changing media data, at least one of the PTS and the DTS of the last PES before the changing and at least one of the PTS and the DTS of the first PES after the changing may be continuously set.

The at least one of the PTS and the DTS define a time stamp of video data. Accordingly, time stamps of the plurality of media data with respect to video data are aligned according to the reproduction times of the plurality of media data as described above. Such alignment of the time stamps based on the reproduction times may be equally applied to audio data. In other words, like the time stamps of the plurality of media data with respect to the video data, time stamps of the plurality of media data with respect to the audio data may also be aligned according to the reproduction times for adaptive streaming.

Figure 11A:
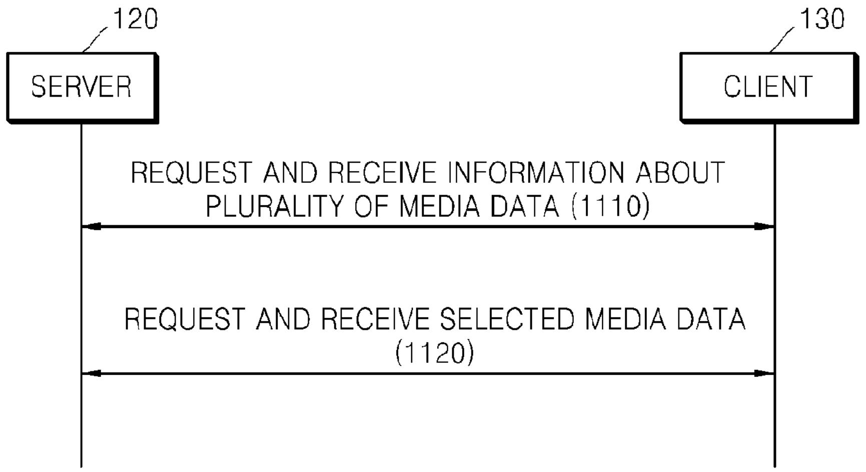
FIGS. 11A and 11B are flowcharts for describing streaming methods according to other exemplary embodiments.

FIG. 11A is a flowchart for describing a streaming method according to another exemplary embodiment.

Referring to FIG. 11A, the client 130 requests information about a plurality of media data from the server 120 in operation 1110. For example, the client 130 may request a media presentation description from the server 120 via an HTTP request, and may receive the media presentation description as an HTTP response. The client 130 transmits a request to the server 120 for and receives the information about the plurality of media data generated by encoding one content to have a plurality of different qualities, so as to perform streaming that is adaptive to a streaming environment. The streaming method of FIG. 11A is different from the streaming method of FIG. 5A in that the information about the plurality of media data is requested and received without requesting and receiving information about content.

In operation 1120, the client 130 transmits a request to the server 120 to transmit at least one of the plurality of media data. The client 130 selects and requests at least one media data that is encoded to have a quality suitable for the streaming environment by referring to the information about the plurality of media data, and receives the requested at least one media data from the server 120.

Figure 11B:
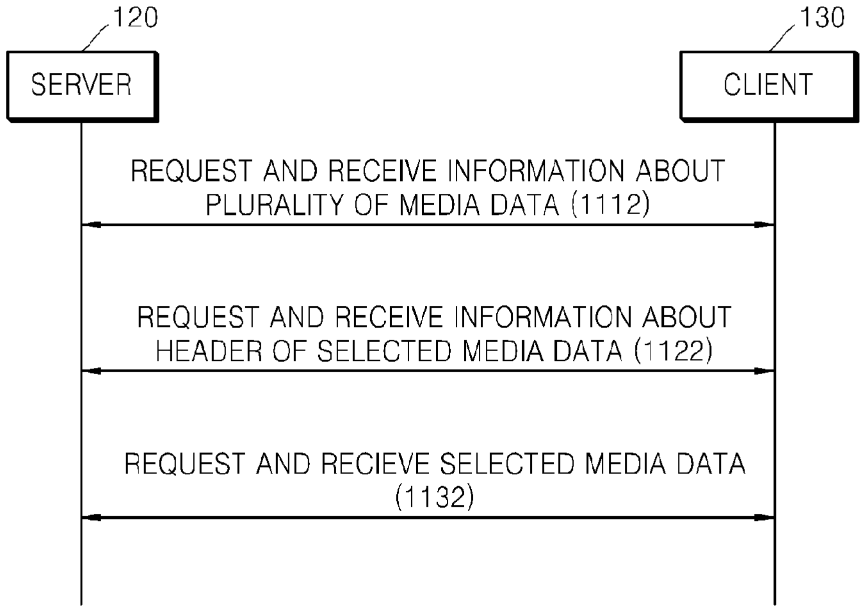

FIG. 11B is a flowchart for describing a streaming method according to another exemplary embodiment.

Referring to FIG. 11B, the client 130 transmits a request to the server 120 to transmit information about a plurality of media data and receives the information about the plurality of media data from the server 120 in response to the request, in operation 1112. For example, the client 130 may transmit a request to the server 120 for a media presentation description through an HTTP request, and receive the media presentation description as an HTTP response.

In operation 1122, the client 130 requests a header of selected media data based on the information about the plurality of media data received in operation 1112. The client 130 requests the header of media data selected according to a streaming environment by referring to the information about the plurality of media data received in operation 1112. In response to the request, the server 120 transmits a file including the header of the selected media data to the client 130.

In operation 1132, the client 130 requests the server 120 to transmit the media data selected based on the information about the plurality of media data received in operation 1112, and the header received in operation 1122. The client 130 transmits a request to the server 120 to transmit at least one segment generated by encoding content in a predetermined quality and dividing the encoded content based on time, and the server 120 transmits the requested at least one segment to the client 130.

Figure 12A:
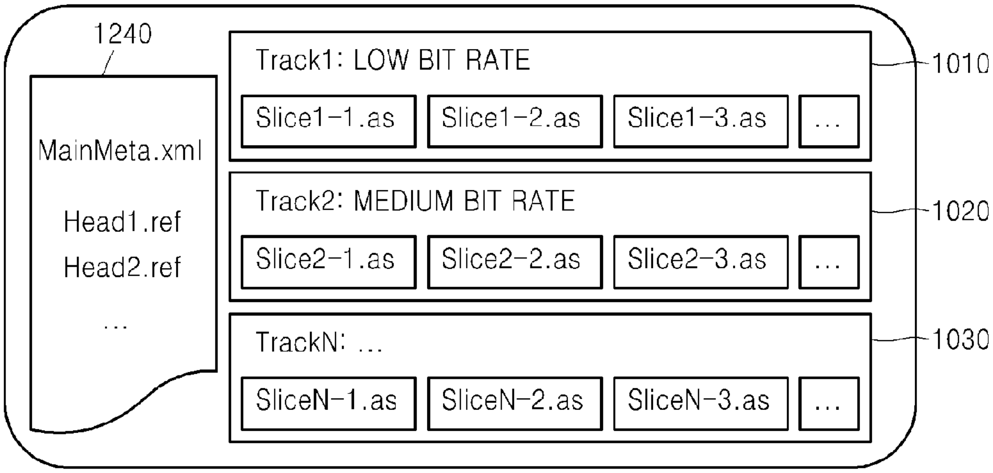
FIGS. 12A and 12C each illustrate a plurality of media data according to other exemplary embodiments.
Figure 12B:
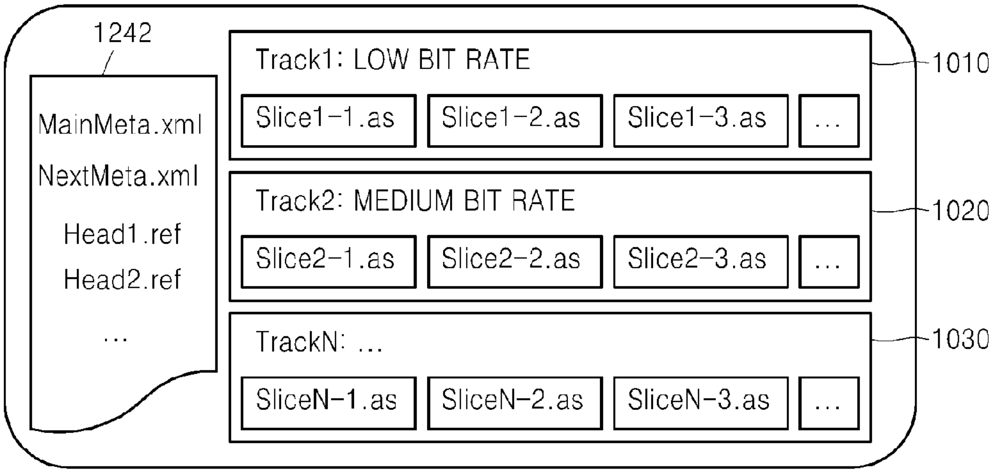
Figure 12C:
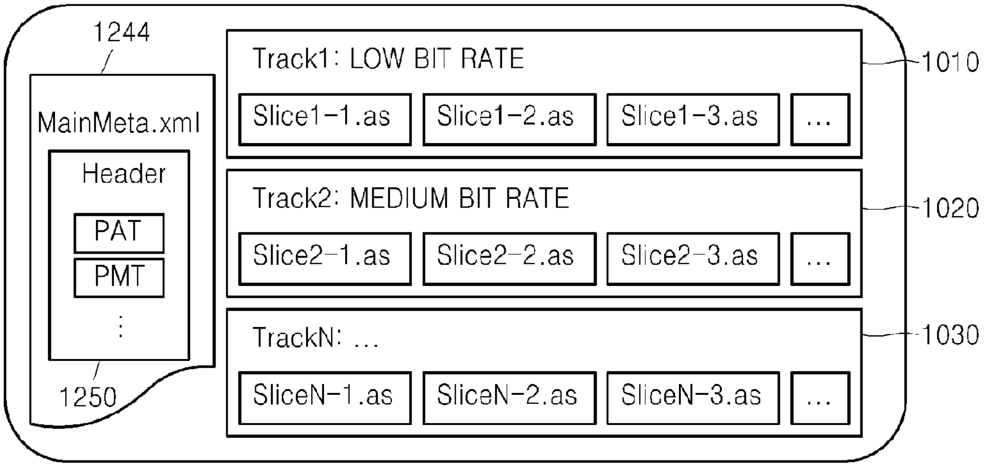

FIGS. 12A through 12C each illustrate a plurality of media data according to other exemplary embodiments. For example, FIGS. 12A through 12C each illustrate the plurality of media data included in the server 120, which are used to perform the streaming methods of FIGS. 11A and 11B.

Referring to FIG. 12A, the server 120 may include the plurality of media data 1010 through 1030 generated by encoding one content to have the plurality of different qualities for streaming that is adaptive to a streaming environment, as shown in FIG. 10A.

Here, the plurality of media data 1010 through 1030 of FIG. 12A is different from the plurality of media data 1010 through 1030 of FIG. 10A in information 1240 used by the client 130 to access the plurality of media data 1010 through 1030, wherein the server 120 includes information about the plurality of media data 1010 through 1030 and not information about content, unlike the exemplary embodiment of FIG. 10A. Here, the client 130 may receive the information about content from another entity instead of the server 120, and may access the plurality of media data 1010 through 1030 included in the server 120 based on the received information about content.

Referring to FIG. 12B, information 1242 used by the client 130 to access the plurality of media data 1010 through 1030 may be prepared by further including a "NextMeta.xml" file to the information 1240 of FIG. 12A.

Referring to FIG. 12C, the header files of the plurality of media data 1010 through 1030 may exist in one header file 1250. The header files do not exist for each of the plurality of media data 1010 through 1030, but may be included in information 1244 used to access the plurality of media data 1010 through 1030, as one header file 1250. The header file 1250 corresponds to the header file 1050 of FIG. 10C.

FIGS. 13A through 13G illustrate media presentation descriptions according to other exemplary embodiments. FIGS. 13A through 13G illustrate media presentation descriptions including information about a plurality of media data transmitted and received between the server 120 and the client 130 according to the streaming methods of FIGS. 5A and 5B, and 11A and 11B.

In operation 520 of FIG. 5A, operation 522 of FIG. 5B, operation 1110 of FIG. 11A, or operation 1112 of FIG. 11B, the client 130 receives the media presentation descriptions according to FIGS. 13A through 13G from the server 120, and selects at least one media data appropriate for a streaming environment from among the plurality of media data based on the received media presentation descriptions. Afterward, in operation 530 of FIG. 5A, operation 542 of FIG. 5B, operation 1120 of FIG. 11A, or operation 1132 of FIG. 11B, the client 130 transmits a request to the server 120 for the selected at least one media data, and receives the at least one media data in response to the request.

Referring to FIG. 13A, the media presentation description includes a "ProgramInformation" tag that is a lower tag of "MPD" corresponding to an uppermost tag. The "ProgramInformation" tag includes a "Period" tag that is a lower tag for dividing a reproduction period of streaming content, and the "Period" tag includes a "Representation" tag corresponding to the plurality of media data which may be streamed in the corresponding reproduction period. While FIGS. 13A through 13G illustrate "Representation" tags, respectively, if a plurality of media data can be reproduced in a predetermined reproduction period, it would be obvious to one of ordinary skill in the art that a plurality of "Representation" tags that correspond to the plurality of media data, respectively, may be defined.

Also, as described above, each media data may include one or more segments that are divided based on time, and the one or more segments may be defined by "SegmentInfo" tags.

The "Representation" tag of FIG. 13A includes at least one of "bandwidth", "resolution", and "framerate" that are attributes to define a quality of media data. The "bandwidth" attribute defines a bandwidth for transmitting and receiving the media data, and may be a bit rate of the media data. The "resolution" attribute defines a resolution of the media data, and if the media data is video data, the "resolution" attribute may define horizontal and vertical sizes of the video data.

The "framerate" attribute defines a frame rate of the media data. If the media data is video data, the "framerate" attribute may define a number of pieces of frames reproduced per unit time, and if the media data is audio data, the "framerate" attribute may define a sampling frequency.

As described above, an element that determines a quality of media data may include various elements including the bit rate, the sampling frequency, the resolution, or the frame rate. The media presentation description of FIG. 13A is different from the media presentation descriptions of FIGS. 9A through 9H in that the media presentation description of FIG. 13A includes the frame rate among the various elements.

In general, as the frame rate increases, a size of the media data increases, and as the frame rate decreases, the size of the media data decreases. Also, a reproducible frame rate of the media data may be limited according to a hardware capability of the client 130. Thus, adaptive streaming that considers the streaming environment may use a plurality of media data to which different frame rates are set. For the adaptive streaming using the frame rates, the "Representation" tag of the media presentation description includes the "framerate" attribute as illustrated in FIG. 13A.

FIG. 13B illustrates a media presentation description of media data having a constant frame rate. A frame rate may be constant or may vary according to a media data encoding method. FIG. 13B illustrates the media presentation description about the media data having the constant frame rate, in which a "framerate" attribute of a "Representation" tag is defined as "CFR/30" so as to indicate that the media data has the constant frame rate of 30.

FIG. 13C illustrates a media presentation description of media data having a variable frame rate. In a case where the media data is encoded with the variable frame rate, a "framerate" attribute of a "Representation" tag is defined as "VFR/30" so as to indicate that the media data has the variable frame rate. Here, "30" may be an average frame rate of the media data having the variable frame rate.

Referring to FIGS. 13B and 13C, the frame rate of the media data is clearly defined to be constant or variable by using "CFR" or "VFR". However, it is also possible to define the frame rate by using only a number as illustrated in FIG. 13D. In a case where a "framerate" attribute is defined as illustrated in FIG. 13D, if a frame rate of media data is constant, the "framerate" attribute indicates that a constant frame rate is "30", and if the frame rate of the media data is variable, the "framerate" attribute indicates that an average frame rate is "30".

FIG. 13E corresponds to a case in which a media presentation description defines a minimum frame rate and a maximum frame rate by using "minframerate" and "maxframerate" when a frame rate of media data is variable.

FIGS. 13F and 13G illustrate media presentation descriptions when a bit rate of media data is constant or variable. As illustrated in FIG. 13F, by defining a "bandwidth" attribute of a "Representation" tag as "CBR/250 kbps", it is possible to indicate that the media data has a constant bit rate of "250 kbps", and as illustrated in FIG. 13G, by defining a "bandwidth" attribute as "VBR/250 kbps", it is possible to indicate that media data has a variable bit rate. "250 kbps" of FIG. 13G indicates that an average bit rate of the media data having the variable bit rate is "250 kbps".

FIGS. 14A through 14D illustrate media presentation descriptions according to other exemplary embodiments.

FIGS. 14A through 14D illustrate media presentation descriptions including information about a plurality of media data transmitted and received between the server 120 and the client 130 according to the streaming methods of FIGS. 5A and 5B, and 11A and 11B.

In other words, in operation 520 of FIG. 5A, operation 522 of FIG. 5B, operation 1110 of FIG. 11A, or operation 1112 of FIG. 11B, the client 130 receives the media presentation descriptions according to FIGS. 14A through 14D from the server 120, and selects at least one media data appropriate for a streaming environment from among the plurality of media data based on the received media presentation descriptions. Afterward, in operation 530 of FIG. 5A, operation 542 of FIG. 5B, operation 1120 of FIG. 11A, or operation 1132 of FIG. 11B, the client 130 requests the server 120 for the selected at least one media data, and receives the at least one media data in response to the request.

Similar to the media presentation description of FIG. 13A, the media presentation descriptions of FIGS. 14A through 14D include attributes, that is, "bandwidth", "resolution", and "framerate" attributes that are related to a plurality of elements for determining quality of content.

In order to further efficiently perform adaptive streaming while minimizing deterioration of image quality, it is necessary to prioritize the plurality of elements. Thus, the media presentation descriptions according to the present embodiment include information about priority among the plurality of elements for determining the quality of the content.

In a case where the streaming content is related to news, there is not a lot of motion of objects on the screen, so the deterioration of the image quality is small although a frame rate is decreased. Thus, compared to the frame rate, a bit rate or a resolution from among the plurality of elements for determining the quality further affects the quality of the content. However, in a case where the streaming content is related to sports, there is a lot of motion of objects on the screen, so the deterioration of the image quality is great if the frame rate is decreased. Thus, compared to the bit rate or the resolution, the frame rate from among the plurality of elements for determining the quality further affects the quality of the content.

In adaptive streaming, the priority among the plurality of elements for determining the quality may function as an important selection standard when the client 130 selects media data appropriate for a streaming environment and requests the server 120 for the media data from among a plurality of media data. Thus, the media presentation descriptions of FIGS. 14A through 14D according to the present embodiment define the information about the priority among the plurality of elements for determining the quality, by using a "qualitydependency" attribute, so that the client 130 may select optimal media data appropriate for the streaming environment.

The "qualitydependency" attribute may be defined in a "Period" tag that is an upper tag of a "Representation" tag with respect to media data. As described above, the "Period" tag is used to divide a reproduction period. Since the "qualitydependency" attribute is defined in the "Period" tag, the client 130 may select one of a plurality of media data by referring to the "qualitydependency" attribute, wherein the plurality of media data may be reproduced in the reproduction period corresponding to the "Period" tag of the media presentation descriptions.

FIGS. 14A through 14D illustrate examples in which the "qualitydependency" attribute is defined in the "Period" tag. However, it is not necessary for the "Period" tag to define the priority among the plurality of elements for determining the quality, and thus, the "qualitydependency" attribute may be defined not in the "Period" tag but in any tag that is an upper tag of the "Representation" tag corresponding to the plurality of media data. For example, if the priority among the plurality of elements for determining the quality of the content is the same in all reproduction periods, the "qualitydependency" attribute may be defined in a "ProgramInformation" tag or a "MPD".

FIG. 14A illustrates a media presentation description including a "Period" tag that defines a "qualitydependency" attribute. Referring to FIG. 14A, the "Period" tag defines the "qualitydependency" attribute together with a "start" attribute, so that the "Period" tag defines priority among a plurality of elements for determining quality in a reproduction period that is defined by the "start" attribute.

Referring to FIG. 14B, a "qualitydependency" attribute may be defined in such a manner that priority among a plurality of elements is concretely described. As illustrated in FIG. 14B, priority among "Resolution", "Bandwidth" and "Framerate" that are a plurality of elements for determining quality may be described in detail by using inequality signs.

Referring to FIG. 14C, a "qualitydependency" attribute may be defined by arraying signs according to a priority order, wherein the signs are allocated to a plurality of elements, respectively. In this regard, "1" may be allocated to "Resolution", "2" may be allocated to a bit rate, that is, "Bandwidth", "3" may be allocated to "Framerate", and then the "qualitydependency" attribute may be defined as "123". The priority among the plurality of element determining a quality according to the definition of FIG. 14C is determined as "Resolution>Bandwidth>Framerate" that is the same as FIG. 14B. A match between the elements and the signs may be performed according to a pre-defined rule set between the client 130 and the server 120.

Referring to FIG. 14D, a "qualitydependency" attribute may be defined by describing only one element that has the highest priority among a plurality of elements. In the example of FIG. 14C, an element from among "Resolution", "Bandwidth" and "Framerate", which has the greatest effect on quality, may be defined by using the "qualitydependency" attribute. In the example of FIG. 14D, "Framerate" is defined as an element that has the greatest effect on quality.

FIG. 15 is a schema of a media presentation description according to another exemplary embodiment.

Referring to FIG. 15, the media presentation description according to the present embodiment includes a "Period" tag that is a tag with respect to a reproduction period, and the aforementioned "qualitydependency" attribute is defined as one of attributes of the "Period" tag. The "qualitydependency" attribute that defines priority among a plurality of elements for determining a quality is defined as a string.

The string may be a string that concretely describes priority among a plurality of elements by using inequality signs as described above with reference to FIG. 14B, or may be a string that arrays signs allocated to a plurality of elements according to a priority order as described above with reference to FIG. 14C. Also, as described above with reference to FIG. 14D, the string may be a string that describes only one element having the highest priority from among a plurality of elements.

Figure 16:
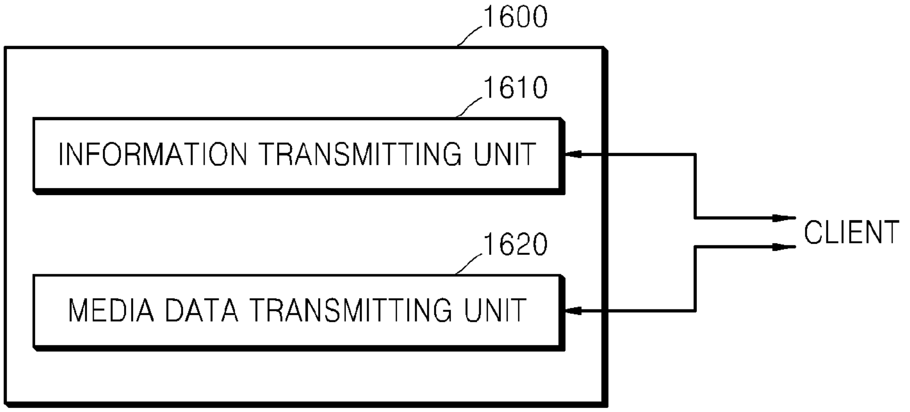
FIG. 16 is a diagram of a media data transmitting apparatus of a server, according to an exemplary embodiment.

FIG. 16 is a diagram of a media data transmitting apparatus 1600 of the server 120, according to an exemplary embodiment.

Referring to FIG. 16, the media data transmitting apparatus 1600 of the server 120 includes an information transmitting unit 1610 and a media data transmitting unit 1620.

The information transmitting unit 1610 receives a request regarding transmission of predetermined information from the client 130, and transmits the requested information in response to the request. The information transmitting unit 1610 receives a request regarding transmission of information about content or information about a plurality of media data from the client 130, and transmits the requested information to the client 130. The information transmitting unit 1610 receives a HTTP request regarding transmission of information about content or information about a plurality of media data from the client 130, according to the embodiments of FIGS. 2A, 2B, 5A, 5B, 11A and 11B, and transmits the requested information as a HTTP response.

The information about the plurality of media data which is transmitted from the server 120 to the client 130 may be media presentation descriptions, and the media presentation descriptions may be those described above with reference to FIGS. 9A through 9H, 13A through 13G, and 14A through 14D.

Thus, as described above with reference to FIGS. 13A through 13G, the media presentation descriptions may include a plurality of elements for determining quality of content, and the plurality of elements may include a bit rate, a resolution, a frame rate, and the like. Also, as described above with reference to FIGS. 14A through 14D, the media presentation descriptions may include information about priority among the plurality of elements.

The media data transmitting unit 1620 receives a request regarding transmission of at least one media data selected from among the plurality of media data according to a streaming environment from the client 130, and transmits the requested media data to the client 130. The media data transmitting unit 1620 receives a request regarding transmission of media data selected based on the information about the plurality of media data which is transmitted from the information transmitting unit 1610 to the client 130. The server 120 may receive a plurality of media data encoded having different qualities from the encoding device 110, and may transmit requested media data to the client 130. Also, according to a transmission request from the client 130, the server 120 may receive in real-time media data from the encoding device 110 and may deliver the media data to the client 130.

The client 130 may request content appropriate for the streaming content, according to the media presentation descriptions transmitted from the information transmitting unit 1610, and the media presentation descriptions may include a plurality of elements for determining quality as described above, so that the client 130 may select at least one media data appropriate for the streaming content based on the plurality of elements and may request the media data transmitting unit 1620 for the at least one media data. As described above, in a case where priority exists among the plurality of elements, the client 130 may select at least one media data appropriate for the streaming content based on information about the priority and may request the media data transmitting unit 1620 for the at least one media data.

Figure 17:
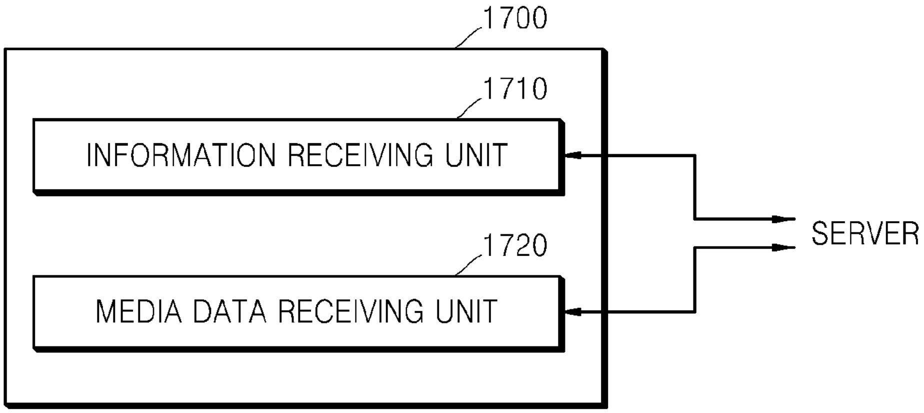
FIG. 17 is a diagram of a media data receiving apparatus of a client, according to an exemplary embodiment.

FIG. 17 is a diagram of a media data receiving apparatus 1700 of the client 130, according to an exemplary embodiment.

Referring to FIG. 17, the media data receiving apparatus 1700 of the client 130 according to the present embodiment includes an information receiving unit 1710 and a media data receiving unit 1720.

The information receiving unit 1710 transmits a request regarding transmission of predetermined information to the server 120, and receives the requested information from the server 120 in response to the request. The information receiving unit 1710 transmits a request regarding transmission of information about content or information about a plurality of media data to the server 120, and receives the requested information from the server 120. The information receiving unit 1710 transmits a HTTP request regarding transmission of information about content or information about a plurality of media data to the server 120, according to the embodiments of FIGS. 2A, 2B, 5A, 5B, 11A and 11B, and receives the requested information as a HTTP response.

The information about the plurality of media data which is received by the client 130 from the server 120 may be media presentation descriptions, and the media presentation descriptions may be those described above with reference to FIGS. 9A through 9H, 13A through 13G, and 14A through 14D.

Thus, as described above with reference to FIGS. 13A through 13G, the media presentation descriptions may include a plurality of elements for determining quality of content, and the plurality of elements may include a bit rate, a resolution, a frame rate, and the like. Also, as described above with reference to FIGS. 14A through 14D, the media presentation descriptions may include information about priority among the plurality of elements.

The media data receiving unit 1720 transmits a request regarding transmission of at least one media data selected from among the plurality of media data according to a streaming environment to the server 120, and receives the requested media data from the server 120. The media data receiving unit 1720 transmits a request regarding transmission of media data selected based on the information about the plurality of media data which is received by the information receiving unit 1710 from the server 120.

The media data receiving unit 1720 may request content appropriate for the streaming content, according to the media presentation descriptions transmitted from the server 120, and the media presentation descriptions may include a plurality of elements for determining quality as described above, so that the media data receiving unit 1720 may select at least one media data appropriate for the streaming content based on the plurality of elements and may transmit a request to the server 120 for the at least one media data. As described above, in a case where priority exists among the plurality of elements, the media data receiving unit 1720 may select at least one media data appropriate for the streaming content based on information about the priority and may transmit a request to the server 120 for the at least one media data.

According to embodiments described herein, adaptive streaming is possible according to the streaming environment by using an existing protocol without changing a configuration of the server and/or the client, whereby it is possible to form an adaptive streaming system compatible with various types of media formats at low cost.

Exemplary embodiments described herein can also be embodied as computer readable codes on a computer readable recording medium.

For example, a streaming apparatus of the server and a streaming apparatus of the client according to exemplary embodiments may include a bus coupled to each unit of apparatuses of FIGS. 16 and 17, and at least one processor connected to the bus. Also, the streaming apparatuses may further include a memory coupled to the at least one processor, so as to store a command, a received message, or a generated message, wherein the at least one processor is connected to the bus to perform the command.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While exemplary embodiments have been particularly shown and described, it will be understood by those of ordinary skill in the art that various changes in form and details may be made therein without departing from the spirit and scope of the present inventive concept as defined by the following claims.

What is claimed is:

1. A method of receiving media data, the method comprising:

receiving a file from a server, wherein the file comprises information about a plurality of media data generated by encoding, with different encoding qualities, predetermined content; and receiving, by a media data receiving apparatus, at least one media data of the plurality of media data, based on the file, wherein the file comprises a plurality of elements including a frame rate, a bit rate, and a resolution for each of the plurality of media data, wherein the file comprises a plurality of first tags comprising the plurality of elements with respect to each of the plurality of media data, wherein the file comprises a second tag which is an upper tag upper to the plurality of first tags, wherein the second tag comprises information about priority among the plurality of elements for determining the qualities, wherein the method further comprises, after receiving the file from the server, selecting at least one media data of the plurality of media data, using the information about the priority among the plurality of elements as a selection standard, and wherein the receiving the at least one media data is in response to a request for the selected at least one media data of the plurality of media data.

2. The method of claim 1, wherein the plurality of first tags further comprise at least one of a title and a type with respect to each of the plurality of media data.

3. The method of claim 2, wherein each of the plurality of media data comprises at least one of a plurality of segments generated by encoding the content to have a predetermined quality and dividing the encoded content according to a time period.

4. The method of claim 1, wherein the information about the priority among the plurality of elements comprises a plurality of signs that are respectively allocated to the plurality of elements and that are arrayed according to a priority order.

5. The method of claim 1, wherein the information about the priority among the plurality of elements comprises information about one element having a highest priority from among the plurality of elements.

6. The method of claim 1, wherein the second tag defines a reproduction period of the content.

7. A non-transitory computer readable recording medium having recorded thereon a program for executing the method of claim 1.

8. The method of claim 1, wherein the plurality of media data comprises a first media data generated by encoding with a first encoding quality, and a second media data generated by encoding with a second encoding quality different from the first encoding quality, the first media data and the second media data corresponding to a same content.

9. A method of transmitting media data, the method comprising:

transmitting a file to a client, wherein the file comprises information about a plurality of media data generated by encoding, with different encoding qualities, predetermined content; and transmitting, by a media data transmitting apparatus, at least one media data of the plurality of media data to the client, according to a request from the client based on the transmitted file, wherein the file comprises a plurality of elements including a frame rate, a bit rate, and a resolution for each of the plurality of media data, and the frame rate differs between at least two of the plurality of media data, wherein the file comprises a plurality of first tags comprising the plurality of elements with respect to each of the plurality of media data, wherein the file comprises a second tag which is an upper tag upper to the plurality of first tags, wherein the second tag comprises information about priority among the plurality of elements for determining the qualities, and wherein the transmitting of the at least one media data comprises transmitting at least one media data selected by the client using the information about the priority among the plurality of elements as a selection standard.

10. The method of claim 9, wherein the plurality of first tags further comprise at least one of a title and a type with respect to each of the plurality of media data.

11. The method of claim 10, wherein each of the plurality of media data comprises at least one of a plurality of segments generated by encoding the content having a predetermined quality and dividing the encoded content according to a time period.

12. The method of claim 9, wherein the information about the priority among the plurality of elements comprises a plurality of signs that are respectively allocated to the plurality of elements and that are arrayed according to a priority order.

13. The method of claim 9, wherein the information about the priority among the plurality of elements comprises information about one element having the highest priority from among the plurality of elements.

14. The method of claim 9, wherein the second tag defines a reproduction period of the content.

15. A non-transitory computer readable recording medium having recorded thereon a program for executing the method of claim 9.

16. A media data receiving apparatus comprising at least one processor which implements:

an information receiving unit which receives a file from a server, wherein the file comprises information about a plurality of media data generated by encoding, with different encoding qualities, predetermined content; and a media data receiving unit which receives at least one media data of the plurality of media data, based on the file, wherein the file comprises a plurality of elements including a frame rate, a bit rate, and a resolution for each of the plurality of media data, and the frame rate differs between at least two of the plurality of media data, wherein the file comprises a plurality of first tags comprising the plurality of elements with respect to each of the plurality of media data, wherein the file comprises a second tag which is an upper tag upper to the plurality of first tags, wherein the second tag comprises information about priority among the plurality of elements for determining the qualities, wherein, after receiving the file from the server, the information receiving unit selects at least one media data of the plurality of media data, using the information about the priority among the plurality of elements as a selection standard, and wherein the received at least one media data is received in response to a request for the selected at least one media data of the plurality of media data.

17. A media data transmitting apparatus comprising at least one processor which implements:

an information transmitting unit which transmits a file to a client, wherein the file comprises information about a plurality of media data generated by encoding, with different encoding qualities, predetermined content; and a media data transmitting unit which transmits at least one media data of the plurality of media data to the client, according to a request from the client based on the transmitted file, wherein the file comprises a plurality of elements including a frame rate, a bit rate, and a resolution for each of the plurality of media data, and the frame rate differs between at least two of the plurality of media data, wherein the file comprises a plurality of first tags comprising the plurality of elements with respect to each of the plurality of media data, and wherein the file comprises a second tag which is an upper tag upper to the plurality of first tags, wherein the second tag comprises information about priority among the plurality of elements for determining the qualities, wherein the transmitted at least one media data comprises at least one media data selected by the client using the information about the priority among the plurality of elements as a selection standard.

18. A method of transferring media data, the method comprising:

an encoding device encoding a content and thereby forming a plurality of media data, each of the plurality of media data generated by encoding, according to a different encoding quality, the content, and a frame rate differs between at least two of the plurality of media data;

the encoding device transmitting the plurality of media data to a server;

the server transmitting a file to a client, the file comprising a plurality of elements including a frame rate, a bit rate, and a resolution for each of the plurality of media data;

the client selecting at least one of the plurality of media data according to a streaming environment, and transmitting a request to the server regarding the selected at least one of the plurality of media data;

the server transmitting the selected at least one of the plurality of media data to the client, wherein the file comprises a plurality of first tags comprising the plurality of elements with respect to each of the plurality of media data, and wherein the file comprises a second tag which is an upper tag upper to the plurality of first tags, wherein the second tag comprises information about priority among the plurality of elements for determining the qualities, wherein the client selects the at least one of the plurality of media data using the information about the priority among the plurality of elements as a selection standard.

19. A method of receiving media data, the method comprising:

receiving, from a server, a file including a plurality of elements including a frame rate, a bit rate, and a resolution for each of a plurality of media data, the plurality of media data generated by encoding, according to a plurality of different encoding qualities, a content, and the frame rate differs between at least two of the plurality of media data;

detecting a streaming environment;

selecting at least one of the plurality of media data according to the detected streaming environment;

transmitting a request to the server regarding the selected at least one of the plurality of media data; and receiving, by a media data receiving apparatus, the selected at least one of the plurality of media data, wherein the file comprises a plurality of first tags comprising the plurality of elements with respect to each of the plurality of media data, and wherein the file comprises a second tag which is an upper tag upper to the plurality of first tags, wherein the second tag comprises information about priority among the plurality of elements for determining the qualities, wherein the selecting comprises selecting the at least one of the plurality of media data using the information about the priority among the plurality of elements as a selection standard.

20. A media data receiving apparatus comprising at least one processor which implements:

an information receiving unit which receives, from a server, a file including a plurality of elements including a frame rate, a bit rate, and a resolution for each of a plurality of media data, the plurality of media data generated by encoding, according to a plurality of different encoding qualities, a content, and the frame rate differs between at least two of the plurality of media data;

a processor which detects a streaming environment and selects at least one of the plurality of media data according to the detected streaming environment;

a processor which transmits a request to the server regarding the selected at least one of the plurality of media data; and a media data receiving unit which receives the selected at least one of the plurality of media data, wherein the file comprises a plurality of first tags comprising the plurality of elements with respect to each of the plurality of media data, and wherein the file comprises a second tag which is an upper tag upper to the plurality of first tags, wherein the second tag comprises information about priority among the plurality of elements for determining the qualities, wherein the processor selects the at least one of the plurality of media data using the information about the priority among the plurality of elements as a selection standard.

* * * * *